US012255692B2

(12) United States Patent
Zhou et al.

(10) Patent No.: US 12,255,692 B2
(45) Date of Patent: *Mar. 18, 2025

(54) POLARIZATION-FOLDING COHERENT OPTICAL TECHNOLOGY FOR SHORT REACH OPTICAL COMMUNICATION

(71) Applicant: Google LLC, Mountain View, CA (US)

(72) Inventors: Xiang Zhou, Sunnyvale, CA (US); Cedric F. Lam, San Jose, CA (US); Ryohei Urata, San Carlos, CA (US); Hong Liu, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,783

(22) Filed: May 12, 2023

(65) Prior Publication Data

US 2023/0283380 A1 Sep. 7, 2023

Related U.S. Application Data

(63) Continuation of application No. 17/228,122, filed on Apr. 12, 2021, now Pat. No. 11,689,292.

(Continued)

(51) Int. Cl.
*H04B 10/60* (2013.01)
*H04B 10/532* (2013.01)
(Continued)

(52) U.S. Cl.
CPC ........ *H04B 10/532* (2013.01); *H04B 10/548* (2013.01); *H04B 10/40* (2013.01);
(Continued)

(58) Field of Classification Search
CPC .... H04B 10/532; H04B 10/548; H04B 10/40; H04B 10/60; H04B 10/61; H04B 10/614; H04B 10/516; H04J 14/06
(Continued)

(56) References Cited

U.S. PATENT DOCUMENTS 5,859,939 A 1/1999 Fee et al.
5,930,414 A 7/1999 Fishman et al.
(Continued)

FOREIGN PATENT DOCUMENTS

CN 112272060 A 1/2021
EP 3051723 A1 8/2016

OTHER PUBLICATIONS

Jose Krause Perin, Anujit Shastri and Joseph M. Kahn, Data Center Links Beyond 100 Gbit/s Per Wavelength, E.L. Ginzton Laboratory, Department of Electrical Engineering, Stanford University, Stanford, CA 94305 USA, Aug. 2018, 17 pages.
(Continued)

*Primary Examiner* — Dibson J Sanchez
(74) *Attorney, Agent, or Firm* — Lerner David LLP

(57) ABSTRACT

Coherent optical communications technology for recovery of 1D and 2D formatted optical signals. For example, 1D or 2D formatted signals that travel through fiber optic media may be recovered by separating the light into X- and Y-polarization components, rotating one polarization component (e.g., Y-component) into the polarization space of the other component (e.g., Y-component into the X-polarization space), delaying the rotated component enough to avoid destructive interference and combining the delayed component with the undelayed component to form a folded optical signal, which may then be processed as a X-polarized signal.

14 Claims, 10 Drawing Sheets

Related U.S. Application Data

(60) Provisional application No. 63/155,003, filed on Mar. 1, 2021.

(51) Int. Cl.
  *H04B 10/548* (2013.01)
  *H04B 10/40* (2013.01)
  *H04B 10/61* (2013.01)
  *H04J 14/06* (2006.01)

(52) U.S. Cl.
  CPC ............ *H04B 10/60* (2013.01); *H04B 10/61* (2013.01); *H04B 10/614* (2013.01); *H04J 14/06* (2013.01)

(58) Field of Classification Search
  USPC .................................. 398/43–103, 202–214
  See application file for complete search history.

(56) References Cited

U.S. PATENT DOCUMENTS

| | | | |
|---|---|---|---|
| 6,421,155 | B1 | 7/2002 | Yano |
| 6,493,473 | B1* | 12/2002 | Wooten ................ G02F 1/0136 385/11 |
| 6,498,673 | B1* | 12/2002 | Frigo ................ G02B 6/29395 359/246 |
| 6,538,787 | B1 | 3/2003 | Moeller et al. |
| 6,801,721 | B1 | 10/2004 | Madsen |
| 7,076,169 | B2 | 7/2006 | Shpantzer et al. |
| 8,280,255 | B2 | 10/2012 | Joyner et al. |
| 8,488,975 | B2 | 7/2013 | Oda et al. |
| 8,611,751 | B2 | 12/2013 | Liu et al. |
| 8,787,708 | B2 | 7/2014 | Doerr |
| 9,094,129 | B2 | 7/2015 | Krause |
| 9,407,376 | B2 | 8/2016 | Lyubomirsky |
| 9,749,060 | B1 | 8/2017 | Wang et al. |
| 9,819,420 | B2 | 11/2017 | Wen et al. |
| 10,205,535 | B1 | 2/2019 | Baehr-Jones |
| 10,591,672 | B2 | 3/2020 | Van Thourhout et al. |
| 10,833,767 | B2 | 11/2020 | Gupta et al. |
| 2002/0018266 | A1 | 2/2002 | Ooi et al. |
| 2002/0118422 | A1 | 8/2002 | Cao |
| 2002/0145787 | A1* | 10/2002 | Shpantzer .......... H04B 10/2543 398/99 |
| 2003/0202749 | A1 | 10/2003 | Madsen |
| 2004/0101227 | A1 | 5/2004 | Takabayashi et al. |
| 2004/0131298 | A1 | 7/2004 | Rasmussen et al. |
| 2004/0165808 | A1 | 8/2004 | Lauzon |
| 2004/0234276 | A1 | 11/2004 | Hayashi et al. |
| 2004/0257564 | A1 | 12/2004 | Madsen |
| 2009/0238579 | A1 | 9/2009 | Rahn et al. |
| 2009/0245795 | A1 | 10/2009 | Joyner et al. |
| 2009/0310966 | A1 | 12/2009 | Qian et al. |
| 2010/0098252 | A1 | 4/2010 | Kanter et al. |
| 2010/0150559 | A1 | 6/2010 | Essiambre et al. |
| 2010/0178065 | A1 | 7/2010 | Nishihara et al. |
| 2010/0322628 | A1 | 12/2010 | Nagarajan et al. |
| 2011/0229149 | A1 | 9/2011 | Grubb et al. |
| 2011/0243556 | A1 | 10/2011 | Nagarajan et al. |
| 2011/0299162 | A1 | 12/2011 | Chen et al. |
| 2012/0093510 | A1 | 4/2012 | Zhang et al. |
| 2012/0134676 | A1 | 5/2012 | Kikuchi |
| 2012/0177384 | A1 | 7/2012 | Ryf |
| 2012/0213521 | A1 | 8/2012 | Zhang et al. |
| 2012/0224184 | A1 | 9/2012 | Li et al. |
| 2012/0263456 | A1 | 10/2012 | Tanaka et al. |
| 2013/0051801 | A1 | 2/2013 | Kuschnerov et al. |
| 2013/0188971 | A1 | 7/2013 | Painchaud |
| 2014/0016894 | A1 | 1/2014 | Evans et al. |
| 2014/0133795 | A1 | 5/2014 | Evans |
| 2014/0153931 | A1 | 6/2014 | Doerr |
| 2015/0043927 | A1 | 2/2015 | Hu et al. |
| 2015/0093117 | A1 | 4/2015 | Rahn |
| 2015/0117809 | A1* | 4/2015 | Wei ................ G02B 6/29302 385/11 |
| 2015/0117872 | A1 | 4/2015 | Lyubomirsky |
| 2015/0139667 | A1 | 5/2015 | Takeuchi et al. |
| 2015/0188658 | A1 | 7/2015 | Rahn |
| 2016/0006537 | A1 | 1/2016 | Inada |
| 2016/0261352 | A1 | 9/2016 | Wen et al. |
| 2017/0093705 | A1 | 3/2017 | Gopalan et al. |
| 2017/0205578 | A1 | 7/2017 | Van Thourhout et al. |
| 2017/0207603 | A1 | 7/2017 | Evans et al. |
| 2017/0261689 | A1* | 9/2017 | Mansouri Rad ........ G02F 1/225 |
| 2018/0143376 | A1 | 5/2018 | Kamei et al. |
| 2019/0342010 | A1 | 11/2019 | Evans et al. |
| 2019/0353918 | A1 | 11/2019 | Kim et al. |
| 2020/0319409 | A1 | 10/2020 | Su et al. |
| 2021/0041644 | A1 | 2/2021 | Fincato et al. |
| 2021/0381858 | A1 | 12/2021 | Lindner et al. |
| 2021/0405308 | A1 | 12/2021 | Bhargava et al. |
| 2024/0044731 | A1 | 2/2024 | Faralli et al. |

OTHER PUBLICATIONS

Rafael Rios Müller, Advanced Modulation Formats And Signal Processing For High Speed Spectrally Efficient Optical Communications, Apr. 21, 2017, 177 pages.

Praveen Kumar Singya, Parvez Shaik, Nagendra Kumar, Vimal Bhatia, and Mohamed-Slim Alouini, A Survey on Design And Performance of Higher-Order QAM Constellations, Apr. 30, 2020, 34 pages.

Zhen Qu, Ivan B. Djordjevic and Jon Anderson, Two-Dimensional Constellation Shaping In Fiber-Optic Communications, May 8, 2019, 13 pages.

J.R. Barry et al., Pulse-Amplitude Modulation, 2004, 71 pages.

Robert Gallager, Channels, Modulation, and Demodulation, Fall 2006, 32 pages.

Jinlong Wei, Talha Rahman, Stefano Calabró, Nebojsa Stojanovic, Liang Zhang, Changsong Kie, Zhicheng Ye and Maxim Kuschnerov, Experimental Demonstration of Advanced Modulation Formats For Data Center Networks On 200 GB/s Lane Rate IMDD Links, Nov. 9, 2020, 11 pages, vol. 28, No. 23.

Jai, et al, Super Nyquist Shaping and Processing Technologies for High Spectral Efficiency Optical Systems, Feb. 2014, SPIE, All Document. (Year: 2014).

Extended European Search Report for European Patent Application No. 21204151.1 dated Apr. 8, 2022. 13 pages.

Extended European Search Report for European Patent Application No. 21204142.0 dated Apr. 11, 2022. 8 pages.

Office Action for European Patent Application No. 21204151.1 dated Oct. 16, 2024. 10 pages.

Office Action for European Patent Application No. 21204142.0 dated Oct. 29, 2024. 10 pages.

* cited by examiner

100

500

600

700

1000

POLARIZATION-FOLDING COHERENT OPTICAL TECHNOLOGY FOR SHORT REACH OPTICAL COMMUNICATION

CROSS-REFERENCE TO RELATED APPLICATIONS

The present application is a continuation of U.S. patent application Ser. No. 17/228,122, filed on Apr. 12, 2021, which claims the benefit of U.S. Provisional Patent Application No. 63/155,003 filed on Mar. 1, 2021, all of which are hereby incorporated herein by reference.

BACKGROUND

Coherent optical communications technology typically involves modulating the amplitude and phase of light, as well as transmission across two polarization states, in transporting information over a fiber optic cable. Coherent optical communications technology offers the potential to make use of more of the available bandwidth of a fiber optic cable or transmission path than competing technologies. Such communications typically make use of a coherent optical receiver. In such a receiver, the transmitted signal is interfered with using a local oscillator (LO) that provides for extraction of phase information and thus referred to as a coherent receiver.

As compared to other forms of optical transmission, such as intensity modulation and direct detection (IM-DD), coherent optical technology offers as possible advantages: higher receiver sensitivity, higher spectral efficiency (SE) and higher tolerance towards various linear optical impairments such as fiber chromatic dispersion (CD) and polarization mode dispersion (PMD). In applications where the state of polarization (SOP) is not maintained during transmission, a phase- and polarization-diversity four dimensional (4D) vector receiver is typically employed to detect and demodulate the coherently modulated signal. 4D refers the separate in-phase (I) and quadrature (Q) components of the X-polarized signal and Y-polarized signal (e.g., Ix, Qx for the X-polarized signal, and Iy, Qy for the Y-polarized signal, which when processed result in separate I, Q for each of the X and Y polarized signals). A 4D vector receiver is also typically used when the received signal is only a two dimensional (2D) modulated optical signal such as a single polarization (SP) quadrature amplitude modulated (QAM) (SP-QAM) signal or a 1D modulated signal such as a SP-pulse amplitude modulation (SP-PAM) signal. Thus, despite only receiving information encoded in two of the dimensions, the complexity of a 4D vector is typically required to process the transmitted signal.

SUMMARY

Aspects of the disclosed technology include methods, systems, and apparatuses that employ or use a two-dimensional (2D) or one-dimensional (1D) coherent receiver. For example, in relatively short reach transmission systems such a receiver can be used to detect and demodulate 2D or 1D coherent modulation formats and may be preferable over 4D vector receivers. Such receivers may be employed where the state of polarization (SOP) may change during transmission through a length of fiber. Such receivers may also be employed in short reach transmission systems where relatively high SE may be considered less critical than in, for instance, networks that span longer distances such as for example metropolitan or long haul optical networks.

Aspects of the disclosed technology include methods, systems, and apparatuses which can include any combination of the following features.

Aspects of the disclosed technology include an optical transmission system including (i) a polarization beam splitter having an input port, a first optical output port and a second optical output port, the input port coupled to an optical communication channel, the first optical output port providing a first optical signal derived from an encoded optical signal received over the optical communication channel and the second optical output port providing a second optical signal derived from the encoded optical signal, the first optical signal having a first polarization component and the second optical signal having a second polarization component; (ii) a delay element coupled to the second optical output port of the polarization beam splitter and configured to delay the second optical signal by a pre-determined time period to produce a delayed second optical signal; (iii) an optical coupler that includes a first input coupled to the first optical output of the polarization beam splitter and a second input coupled to the delay element so as to receive the delayed second optical signal, the optical coupled combining the first optical signal and the delayed second optical signal to form a combined optical signal, and (iv) a polarization rotator configured to rotate a polarization component of either the second optical signal or the delayed second optical signal into a polarization state corresponding to the first polarization component. The polarization beam splitter can include the polarization rotator and the second optical signal can be rotated into the polarization state corresponding to the first polarization component. The polarization rotator can be coupled to the delay element and configured to receive the delayed second optical signal and can rotate a polarization state of the delayed second optical signal into the polarization state corresponding to the first polarization component. The polarization rotator can be coupled to the delay element and can be configured to receive the delayed second optical signal and can rotate a polarization state of the delayed second optical signal into the polarization state corresponding to the first polarization component. The optical coupler can include a polarization rotator. The optical coupler can comprise a 3-dB coupler. The combined optical signal can comprise a folded optical signal in which the first optical signal can comprise a first X-polarized signal and the delayed second optical signal comprises a second X-polarized signal delayed by the predetermined time period. The predetermined time period can comprise a time period of one more symbol period. A symbol period can correspond to a time period it takes to transmit a predetermined number of bits. An X-polarized hybrid element can recover respective in-phase (I) and quadrature phase (Q) optical signals from the folded optical signal. A first and second photodetector/ transimpedance amplifiers can receive the respective in-phase (I) and quadrature phase (Q) optical signals and can produce respective first and second electrical I and Q signals. First and second analog-to-digital converters can convert the respective first and second electrical I and Q signals into respective electrical digital signals.

Aspects of the disclosed technology include a method for transmission of signals. The method can include deriving for output, from an encoded optical signal received at a polarization beam splitter (PBS), a first optical signal at a first output port of the PBS and a second optical signal at a second output port of the PBS, the first optical signal having a first polarization component and the second optical signal having a second polarization component; delaying the second optical signal by a pre-determined time period to produce a delayed second optical signal; combining the first optical signal and the delayed optical signal at an optical coupler; and rotating a polarization component of either the second optical signal or the delayed second optical signal. The method can include a polarization beam splitter which can rotate, combine, or rotate and combine either the second optical signal or the delayed second optical signal. The optical coupler can include a polarization rotator. The optical coupler can include a 3-db coupler or other coupler. The combined optical signal can comprise a folded optical signal in which the first optical signal comprises a first X-polarized signal and the delayed second optical signal comprises a second X-polarized signal delayed by the predetermined time period. The predetermined time period can comprise a time period of one more symbol period. A symbol period can correspond to a time period it takes to transmit a predetermined number of bits. An X-polarized hybrid element can be configured for respective in-phase (I) and quadrature phase (Q) optical signals from the folded optical signal. A first and a second photodetector/transimpedance amplifiers can be configured for receiving the respective in-phase (I) and quadrature phase (Q) optical signals and produce respective first and second electrical I and Q signals. A first and a second analog-to-digital converters can be configured for converting the respective first and second electrical I and Q signals into respective electrical digital signals.

Aspects of the disclosed technology include an optical system comprising an optical modulator that can outputs an in-phase (I) signal and a quadrature phase (Q) signal; a delay element for delaying the in-phase (I) signal and the quadrature phase (Q) signal by a pre-determined time period to produce a delayed in-phase (I) signal and a delayed quadrature phase (Q) signal; a polarization beam combiner (PBC) that can output the in-phase (I) signal, the quadrature phase (Q) signal, the delayed in-phase (I) signal, and the delayed quadrature phase (Q) signal as a folded optical signal having polarized light corresponding to a first polarization component; and a receiver that can receive the optical signal, the receiver including a polarization beam splitter (PBS) that separates the received optical signal into the first polarization component and a second polarization component. The receiver can comprise a polarized hybrid element for recovering respective in-phase (I) and quadrature phase (Q) optical signals from the folded optical signal. The first polarization component can corresponds to X-polarized light and the second polarization component corresponds to Y-polarized light. The polarized hybrid element can comprise a X-polarized hybrid element. The first and second photodetector/transimpedance amplifiers can be coupled to an output of for receiving the respective in-phase (I) and quadrature phase (Q) optical signals and produce respective first and second electrical I and Q signals. First and second analog-to-digital converters can convert the respective first and second electrical I and Q signals into respective electrical digital signals.

Aspects of the disclosed technology can include a method for transmission of optical signals. The method can include modulating a baseband information signal to produce an in-phase (I) signal and a quadrature phase (Q) signal; delaying the in-phase (I) signal and the quadrature phase (Q) signal by a pre-determined time period to produce a delayed in-phase (I) signal and a delayed quadrature phase (Q) signal; combining the in-phase (I) signal, the quadrature phase (Q) signal, the delayed in-phase (I) signal, and the delayed quadrature phase (Q) signal as a folded optical signal having polarized light corresponding to a first polarization component; and separating the received optical signal into the first polarization component and a second polarization component. The method can include recovering respective in-phase (I) and quadrature phase (Q) optical signals from the folded optical signal at a receiver containing a polarized hybrid element. The method can include the first polarization component corresponding to X-polarized light and the second polarization component corresponds to Y-polarized light. The method can include the polarized hybrid element comprising an X-polarized hybrid element. The method can include receiving the respective in-phase (I) and quadrature phase (Q) optical signals and produce respective first and second electrical I and Q signals occurs at a first and a second photodetector/transimpedance amplifiers are coupled to an output. The method can include converting the respective first and second electrical I and Q signals into respective electrical digital signals occurs at a first and a second analog-to-digital converters.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Overview

Figure 1:
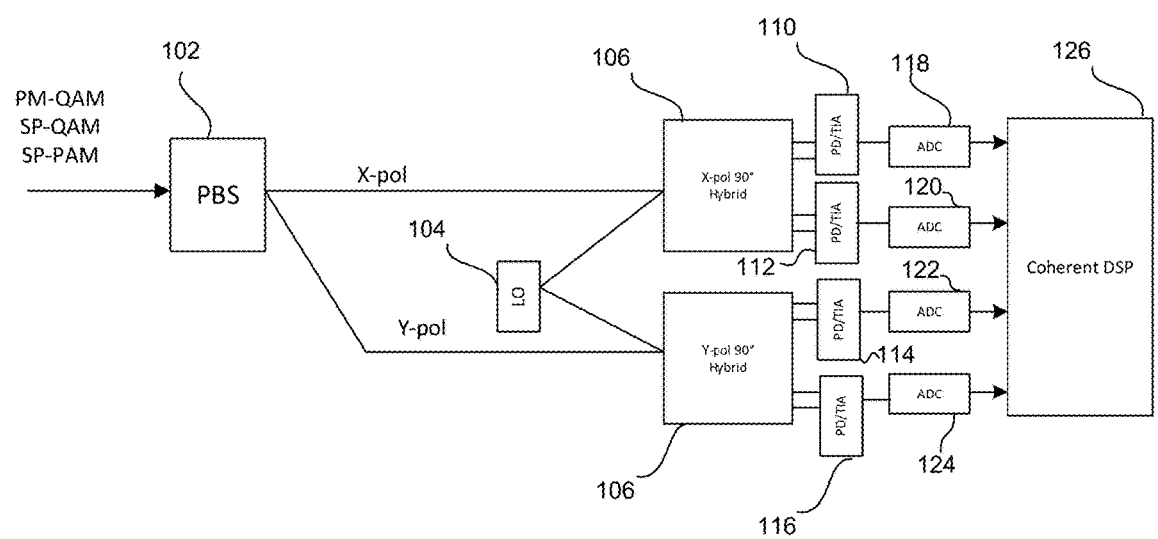
FIG. 1 illustrates a schematic example system of a possible 4D receiver.

Aspects of the disclosed technology enable the transmission of certain 2D and 1D modulation formats, such as QAM, PAM, and other optical transmission formats, without the use of a 4D receiver through the introduction of a methods, systems, and apparatuses related to a class of polarization-folding based coherent optical technology.

For example, aspects of the disclosed technology may comprise a coherent optical receiver that processes a received optical signal by separating the X- and Y-polarization components, rotates the Y-polarization component into the X-polarization space, delays the rotated Y-polarization component by one or more symbol periods (e.g., one or more T) before recombining or folding, through a 3 dB optical coupler, the delayed Y-component into the X-component. In other examples, the concept of folding may be considered the acts of rotating the Y-polarization component into X-polarization space or state and combining the rotated Y-component with the X-component via a 3-dB optical coupler. The folded Y-component may be detected as a delayed, by one or more symbol periods, X-polarized signal. The resulting combined or folded signal may be detected using a phase diversity 2D coherent receiver, which employs less electronic components, such as for example photo detectors (PDs), transimpedance amplifiers (TIAs), analog-to-digital converters (ADCs), than a 4D vector coherent receiver. In some examples, the 2D coherent optical receiver may require only about one-half the number of electronic components as a 4D vector receiver.

In another example, aspects of the disclosed technology may be employed at a transmitter and a receiver in an optical network. For instance, a QAM transmitter may be configured such that both outputs of the in-phase/quadrature (I/Q) modulator are utilized. More specifically, one output of the I/Q modulator may be delayed by one or more symbol period T and combined with the other output using a polarization beam combiner (PBC). In this example, the transmitted Y-polarization component is essentially a delayed copy of the I/Q-folded X-polarization component, implying a redundant signal being carried over the Y-polarization component. In this example, a receiver comprises a PBS to generate the X- and Y-polarized signals. Because the Y-component was folded at the transmitter, the received X-polarized signal includes both the original X-polarized optical signal component and Y-polarized optical signal component. Thus, only processing of the X-polarized signals at the receiver may be necessary. This example may result in a 3 dB link budget gain. In addition, in this example, the receiver need not employ polarization folding functionality.

Aspects of the disclosed technology may thus enable a less complex receiver design for coherent detection and demodulation of 2D and 1D modulated optical signals as compared to a 4D vector coherent receiver.

Aspects of the disclosed technology enable the use of a 2D vector coherent optical receiver to detect and demodulate 2D or 1D modulated optical signals without using an external endless optical polarization controllers. Aspects of the disclosed technology allow for polarization folding. Aspects of the disclosed technology include improved transmitter, receiver and digital signal processors, which can in some examples, be configured to work with polarization folded signals. For instance, in accordance with an aspect of the disclosed technology, digital signal processors may implement a state-reduced and multiplier-free algorithm in processing the signals output from a receiver configured to detect the polarization folded signals. Such digital signal processors may likely exhibit reduced power consumption.

In addition, the disclosed technology may avoid the use of external endless optical polarization controllers. The disclosed technology may also avoid an extra optical loss from an optical polarization controller and uses a simplified coherent receiver "front end."

Aspects of the disclosed technology may also increase robustness against random link polarization changes. The disclosed technology, as compared to techniques employing polarization and phase diversity 4D vector coherent receivers, may reduce the required number of photodetectors (PDs), transimpedance amplifiers (TIAs) and analog-to-digital converters (ADCs) by one-half.

Aspects of the disclosed technology may enable smoother direct detection to coherent detection transition in DC interconnection networks as well as lower cost mobile front/middle haul and fiber access networks. Furthermore, the disclosed technology may meet or resolve the polarization diversity requirements for technologies such as photonic integrated circuits, such as for example, silicon, Indium Phosphide based, or others circuits, which are inherently polarization sensitive.

Aspects of the disclosed technology may be used in short-reach optical communication applications such as data center (DC) interconnects, mobile (5G/6G) front/middle haul as well as future high-speed fiber access networks. The disclosed technology enables a simpler receiver for coherent detection of 2- or 1-dimensionally (2D or 1D) modulated optical signals (as compared to the conventional phase- and polarization-diversity 4D vector coherent optical technique). The proposed new coherent optical technology can enable smoother direct detection to coherent detection transition in the DC interconnection networks (from 200 Gb/s per wavelength to 400 Gb/s per wavelength) as well as lower cost mobile front/middle haul and fiber access networks.

Aspects of the disclosed technology allow for use of a 2D or 1D coherent receiver in short reach transmission systems, or in systems where high SE may be less critical such as for example traditional metro and long-haul optical networks. As one example, to scale datacenter interconnects from 200 Gb/s per wavelength IM-DD based technology to 400 Gb/s per wavelength coherent technology, 2D single polarization (SP) 16QAM could be a better choice than the 4D polarization-multiplexed (PM)-16QAM, since the SP-16QAM requires only two Mach-Zehnder modulators (MZMs) while the PM-16QAM require 4 MZMs. For 5G/6G middle/front haul and fiber access networks where the required data rate is lower while fiber CD/PMD may still be a significant problem, 1D coherent PAM (or 2D SP-xQAM) may be a better choice than the 4D PM-xQAM, since the 1D PAM only requires 1 modulator while the PM-xQAM requires 4 modulators. Scaling of this magnitude is enabled by the disclosed technology.

Example Systems

The following example systems illustrate aspects of the disclosed technology. A person of skill in the art should understand that the various disclosed components can be coupled electronically by one or more of the disclosed electronics, processors, and computing devices to perform the methods and techniques disclosed herein. For simplicity and clarity, not every electronic or data link is illustrated.

With reference to the Figures below, rotation of an "X" and "Y" component of light are described. A person of skill in the art will appreciate that the "X" and "Y" components described are one formulation or convention to represent the transmission of light, and that further, either component can be rotated or "folded."

FIG. 1 is a diagram illustrating an example polarization and phase diversity 4D vector coherent receiver, receiver 100. Receiver 100 consists of a polarization beam splitter (PBS) 102 component or circuitry, local oscillator (LO) 104 circuitry, X-polarization hybrid 106 component or circuitry, Y-polarization hybrid 108 component or circuitry, photodetectors (PDs), transimpedance amplifiers (TIAs) components or circuitry 110, 112, 114, 116, analog to digital convertors (ADCs) circuitry 118, 120, 122, and 124, and a digital signal processor (DSP) circuitry 126. The hybrid is an optical device used to coherently mix the incoming optical signal and the local oscillator (LO) for coherent detection systems. The X-polarization hybrid is used for the X-polarization signal component while the Y-polarization hybrid is used for the Y-polarization signal components. The component or circuitry may comprise optical and/or electrical circuitry. A PBS may comprise an optical element that may change the polarization of light passing through it based on optical effects such as birefringence and could be considered an optical circuit element. Other components or circuitry such as TIAs and ADCs may comprise electrical components such as one or more resistors, transistors, capacitors, operational amplifiers, current or voltage supply, ground leads, comparators, digital processing elements, etc. configured to carry out their function as would be understood by those of skill the art.

PBS 102 can receive a signal which can be modulated or configured according to an encoding scheme. For example, the PBS may receive QAM encoded information as a light signal. PBS 102, for example, may receive PM-QAM, SP-QAM or SP-PAM optical signals. PBS 102 may split a beam of light carrying such optical signals into two orthogonal polarization states or components, such as an "X" polarization and a "Y" polarization component. In some examples, PBS 102 may be a plate beamsplitter or a cube beamsplitter.

Local oscillator 104 provide a local reference signal which is provided to X-polarization hybrid 106 and Y-polarization hybrid 108. At the X-polarization hybrid 106 and Y-polarization 108 circuitry, X-polarized component and Y-polarized component signals from PBS 102 are interfered with or mixed using the LO or reference signal so as to extract the phase information from the signal, e.g., the I and Q components. The signals from the X-pol. and Y-pol. hybrids 106, 108 comprises each of I and Q signals that are fed to PD/TIAs 110-116. [Inventor Question: The eight lines going into the PD/TIAs are respective, I+, I−, Q+, Q− signals for each of the X- and Y-signals derived from the X- and Y-components.

PD/TIAs components or circuitry 110-116 may comprise any combination of photodetectors and transimpedance amplifiers. In general, a photodetector may be any semiconductor device that converts light into an electrical current. Photodetectors may comprise a photodiode or a photosensor. The disclosed technology is not limited to any particular photodetector and any photodetector capable of converting light photons into electric current may be used in FIG. 1 as well as in the other example systems where PDs are employed. A photodetector can also be made of an array of photodetectors. In general, a transimpedance amplifier (TIA) can be a current to voltage converter device which can be used to amplify the current output of a photodetector or other photon or light detection device. PD-TIAs can thus be used to detect both the in-phase (I) and quadrature (Q) components of the light signals output by the X-pol. and Y-pol. hybrids 106, 108 and output respective I and Q signals for associated with each of the X-polarized and Y-polarized components.

Signals outputted from PD-TIAs may be converted by ADCs 118-124 from analog signals to digital signals. These digital signals are digital representations of the respective I and Q signals.

Digital signal processor 126 receives the digital signals output from ADCs 118-124. Digital signal processor 126 may then process the signals it receives to extract information encoded and transmitted over the fiber channel or cable from a transmitting station or transmitter.

As shown, receiver or system 100 employs two 90° hybrid blocks or circuitry, four PD/TIAs and four ADCs. Receiver 100 is an example of a 4D vector receiver. Such receivers are not only typically used to recover 4D signal formats, but also 2D and 1D. However, given the additional circuit components employed by such receivers, such receivers come at additional cost, even in deployments or applications, e.g., short range 2D and 1D, where using such 4D vector receivers may not be entirely necessary.

Figure 2:
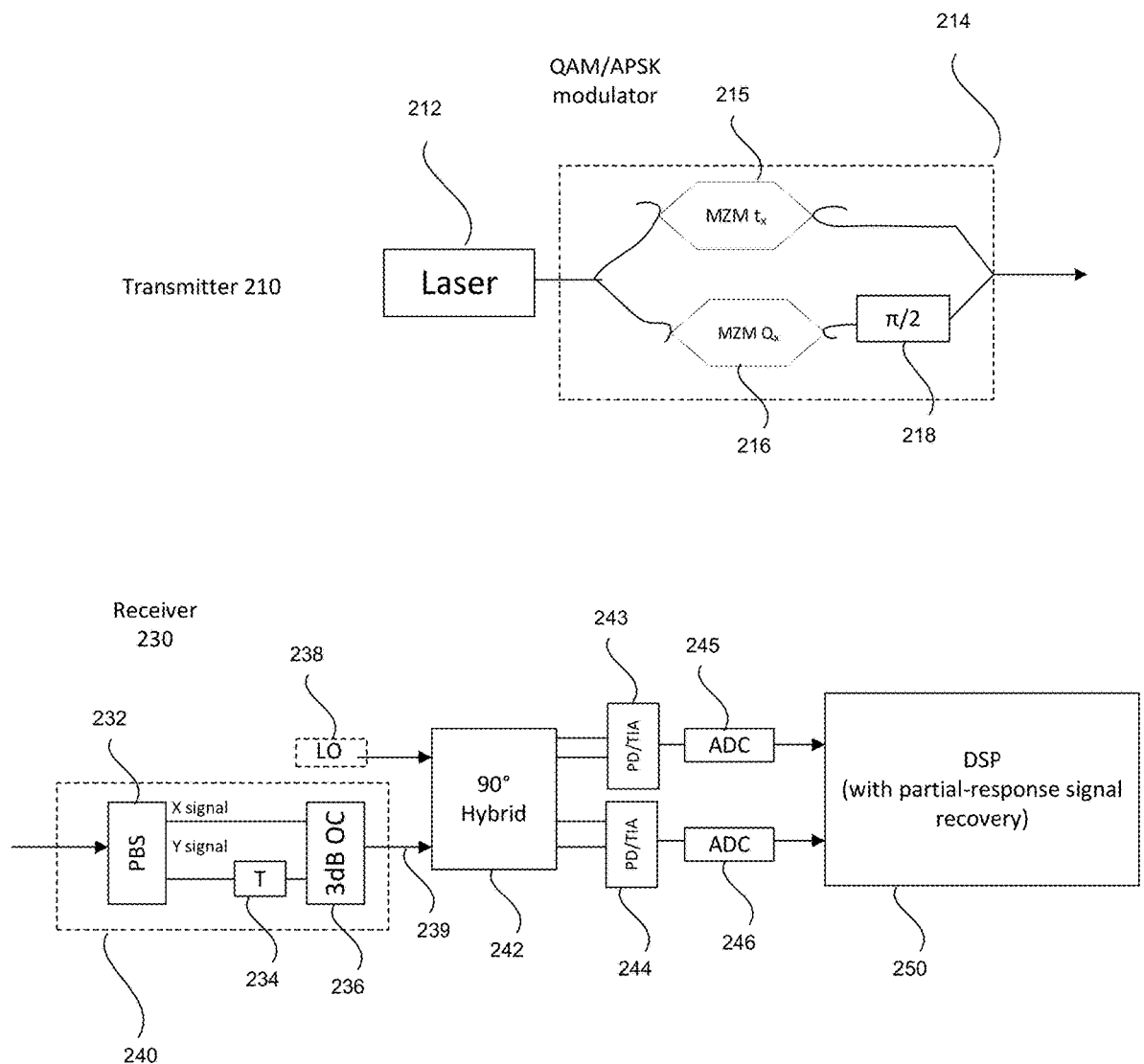
FIG. 2 illustrates a schematic example system according to aspects of the disclosure which can be used for 2D modulation formats.
Figure 3:
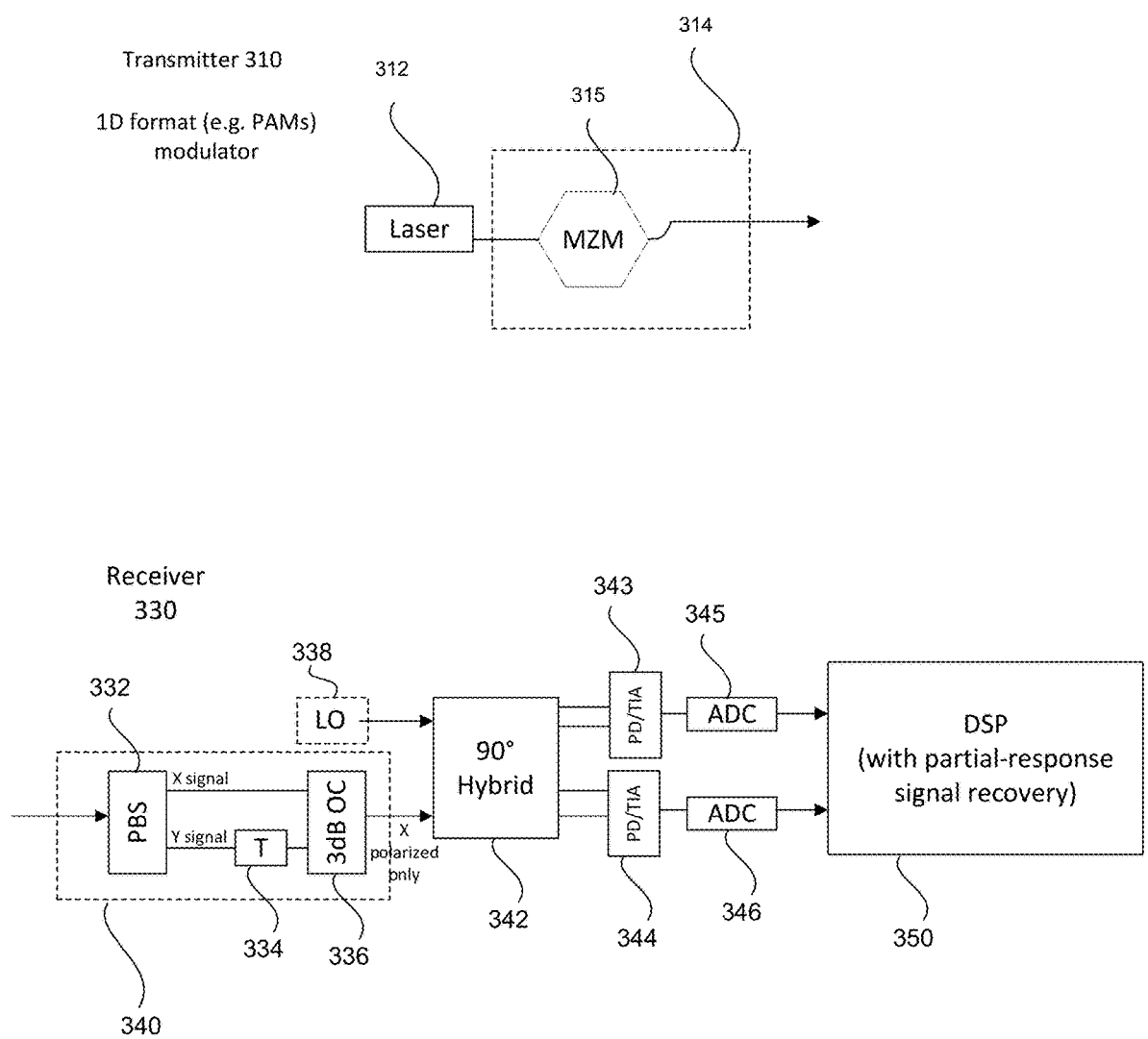
FIG. 3 illustrates a schematic example system according to aspects of the disclosure which can be used for 1D modulation formats.

FIG. 2 depicts an example system 200 illustrating coherent optical technology in accordance with one or more aspects of the disclosed technology. The system 200 may be used for transmission and recovery of information encoding using 2D modulation formats. In FIG. 2 a description is given for the use of the system 200 for 2D modulation, such as a QAM or APSK format. System 200 can also be modified to transport signals modulated in accordance with a 1D format, such as a 1D PAM format, as shown in FIG. 3 and explained below.

System 200 may include a transmitter 210 and a receiver 230. In some examples, transmitter 210 can comprise a light source, such as laser 212. Laser 212 can be any light source, including but not limited to any combination of lasers, e.g., specially designed semiconductors, incandescent light, electrodeless lamps, or halogen lamps. As another example, laser 212 can be a distributed feedback laser. Laser 212 can be controlled with a controller or a computer to operate the laser in a manner to allow transmission of the modulated light. Laser 212 is coupled optically to modulator 214.

In some examples, modulator 214 can be a QAM modulator or an amplitude-phase shift keying (APSK) modulator. In other examples, modulator 214 can produce other 2D modulation formats. Modulator 214 includes a first Mach-Zehnder modulator (MZM) 215 which receives a portion of an optical signal generated by laser 212 and a second MZM 216 which also receives a portion of the light generated by laser 212. The first MZM 215 generates the in-phase or I signal, while the second MZM 216 and phase shifter 218 generate the quadrature or Q signal. In some examples, a Mach-Zehnder modulator (MZM) can be an interferometric structure which is made from materials with strong electro-optic effects, such as for example, LiNbO3, GaAs, and InP. Through the selective application of electric fields within the paths of the MZM, such as to the arms of the MZM, the optical lengths traveled by an optical signal can change, thus resulting in phase modulation of the optical signal. In some examples, combining the different phase modulation converts phase modulation into intensity modulation.

A 90° (π/2) phase shift is introduced to the signal output by MZM 216 by element 218. Element 218 may comprise any 90° optical phase shifter. Some examples of such phase shifters include thermal phase shifter and electro-optical phase modulators.

The signals from MZM 215 and phase shifter 218 are combined through a 3-dB coupler (illustrated via combining the two lines into one at the output of transmitter 210) to form the output of modulator 214, which output may be inserted into an optical fiber (illustratively depicted as the arrow from modulator 214) for transmission from the transmitter 210 to receiver 230.

At receiver 230, the transmitted signal first encounters PBS 232. PBS 232 may be similar to PBS 102. Thus, PBS 232 can separate the "X" and "Y" polarization components of the received optical signal and output those as separate signals X- and Y-components. In some examples, the PBS 102 also additionally rotates the Y-component so that it is also output as X-polarized signals. In such examples, the signals at both output of PBS 102 comprise X-polarized signals as a result of the rotation of the Y-component signal. However, the rotation of the "Y" component need not occur at or in the PBS and can, as explained below, occur at an optical coupler or after delay bock 234.

The "Y" component signal (which has now been rotated into a X-polarization state) is fed to a time delay element 234, which delays the signal it receives by one or more symbol periods T. In some examples, the time period 'T' can be related to a period of a frequency of the light which has been encoded and being transmitted that is determined so as to avoid destructive interference between a delayed portion of an optical signal and a portion which has not been delayed, such as for example, the X-polarization and Y-polarization components. The signals outputted from the PBS and the time delay module 234 are coupled to an optical coupler (OC) 236, which then combines them into an output signal 239. As a result of the rotating the Y-polarization component onto to X-polarized signals, delaying it by a symbol period T and combining or folding delayed signal X-polarized signal from the X-polarization component, output signal 239 includes two copies of the X-polarized signals, first X-polarized signals outputted from the output from a first port of PBS 232, and second delayed X-polarized signals as a result of the polarization rotation within PBS 232 and folding within 3 dB coupler 236. Output signal 239 may therefore be further processed as the I and Q components of only X-polarized signals, eliminating the need for a "4D" vector coherent receiver.

Collectively, PBS 232, time delay module 234 and optical coupler 236 may be considered a polarization-folding unit 240. In some examples, the concept of folding may be considered the act of combining, at OC 236, the X-signals from one port of the PBS 232 with the Y-signals rotated into the X-polarized space from the other port of PBS 232 and delayed by delay element or block 234. In other examples, the concept of folding may be considered the acts of rotating in PBS 232 and combining in OC 236. Optical coupler 236 can lead to a decay in signal strength. In some examples, an optical coupler may cause a loss of signal strength on the order of 3 dBs. A person of skill in the art will appreciate that although a separate optical rotator has not been illustrated, polarization-folding unit 240 can contain a separate optical rotator at other locations along the optical path, such for example a rotator to rotate the Y-polarization component as part of delay element 234, or as part of optical coupler 236, as long polarization rotation occurs before combining via a coupler. In addition, in some examples, instead of rotating the Y-component into the X-polarization space, the X-component may be rotated into Y-polarization space, delayed by one or more symbol periods, and then combined in a coupler with the Y-signal associated with the Y-component. In this example, two signals appearing as Y-polarized light (one delayed and the other not delayed) may be processed as shown in FIG. 2.

The output from optical coupler 236 can be mixed or interfered with a signal from a local oscillator 238 so that the I and Q components of output signal 238 are recoverable (e.g., I(t), I(t−T), Q(t), Q(t−T) for the X-polarized signals). Local oscillator can be similar to local oscillator 104. The signal from local oscillator 238 and output from optical coupler 236 can be transmitted to a 90 degree hybrid 242. Although the 90 degree hybrid is receiving only "X" polarized signals, the "Y" component, referred to herein as the "Y" signal after arriving at a receiver, can recognized as it has been delayed by a period of "T." Thus, it is possible to distinguish between the "X" and "Y" portion of the signal being transmitted by transmitter 210. 'T' can be a constant or a multiple of a constant such that the two components of light do not destructively interfere with one another.

90 degree hybrid 242 outputs the X polarized light which contains both the information in the x and the y signal and can contain both the I and Q component of the light. The signal outputted from the 90 degree hybrid 242 is transmitted to PD/TIA 243 and PD/TIA 244. PD/TIAs 243-244 can be similar to PD/TIAs 110-116. PD/TIA 243 output analog electrical signals of the I and Q signals to respective ADCs 245 and 246 as shown. The output of ADCs 245 and 246 are then coupled to DSP 250.

With reference to FIG. 2, the following equations may be used to describe the behavior of system 200. For simplicity, the carrier phase is neglected in the formulations which follow. In this regard, the signal output of a QAM transmitter can be modeled by the following equation:

$$\hat{E}(t) = [I(t) + jQ(t)]\hat{x} \quad (1)$$

where:
- $\hat{E}_T$: The outputted signal of a QAM transmitter as a function of time.
- I(t): The "in-phase" component of the outputted signal as a function of time.
- Q(t): The quadrature or perpendicular component of the outputted signal as a function of time.
- j: An "imaginary" component related to phase.
- $\hat{x}$: The 'X' component or 'X' polarization of the outputted signal.

For short-reach optical communications that use optical fiber as the communications medium, the state of polarization (SOP) of the transmitted signal may change during transmission. The relationship between the transmitted signals or signals input into the fiber and the received signals or signals output from the fiber after transmission can be represented by a polarization matrix. That matrix may be modeled as 2×2 unitary matrix with two independent angle parameters, α and θ as follows:

$$U = \begin{pmatrix} \cos(\alpha) & \sin(\alpha)e^{-j\theta} \\ -\sin(\alpha)e^{-j\theta} & \cos(\alpha) \end{pmatrix}$$

Applying the polarization matrix to ET allows the polarized rotated signal to be represented as:

$$\hat{E}_R(t) = \cos(\alpha)[I(t)+jQ(t)]\hat{x} - \sin(\alpha)e^{-j\theta}[I(t)+jQ(t)]\hat{y} \quad (2)$$

where:
- $\hat{y}$: The 'Y' component or 'Y' polarization of the outputted signal.
- α: The angle between the actual signal oscillation direction (the signal vector direction in the X- and Y-polarization space) and the reference direction. α can take values between 0 to 90 degrees.
- Θ: The phase difference between the X-polarized component and the Y-polarized component. Θ can take values between 0 to 90 degrees.

This equation represents the received polarization-rotated 2D vector optical signal at the input to receiver 230 at folding unit 240.

With reference to equation 2, the portion preceding the X can be considered to be the "X" signal and the portion preceding they can be considered to be the "Y" signal. As the $\hat{x}$ or $\hat{y}$ polarizations may be rotated, the component of each polarization can be referred to as the signal from each component after transmission from the transmitter and at the input of a receiver. With reference to other Figures used in this disclosure, the "X" and the "Y" signal can have similar meaning.

PBS 232 separates the X and Y received polarization components, as well as rotates the Y-polarization component into the X-polarization component. As the Y component is delayed by a time of 'T', the signal leaving polarization-folding unit 240 can be represented as:

$$\hat{E}_{Rx}(t) = \frac{\sqrt{2}}{2}\cos(\alpha)[I(t)+jQ(t)]\hat{x} - \frac{\sqrt{2}}{2}\sin(\alpha)e^{-j\theta}[I(t-T)+jQ(t-T)]\hat{x} \quad (3)$$

$\hat{E}_{Rx}(t)$ is 2D vector optical signal, which can be detected by a phase-diversity 2D coherent receiver as shown in FIG. 2 and can be viewed as the result of folding the Y-polarization component into the X-polarization component. This approach may be considered as polarization folding coherent technology. Introduction of the delay T, or multiple T, before folding the Y-polarization component into the X-polarization space mitigates against destructive interference between X-polarization component and Y-polarization component under certain link polarization conditions. One skilled in the art should appreciate from $\hat{E}_{Rx}(t)$ that it includes both the originally received X-polarization optical signal component, $\cos(\alpha)[I(t)+jQ(t)]$, and that the originally received, but delayed, Y-polarization optical signal component, $\sin(\alpha)e^{-j\theta}[I(t-T)+jQ(t-T)]$.

As a delay of 'T' was introduced on the Y polarization component before it was folded back into the X component, the polarization-folded optical signal shown in equation (3) above can be understood to be a 2D 1-tap partial response signal. This signal can be demodulated using one or more algorithms. Non-limiting examples of applicable algorithms include partial-response signal recovery algorithms such as for example, maximum-likelihood sequence estimation (MSLE) algorithms.

FIG. 3 depicts an example system 300 illustrating coherent optical technology in accordance with one or more aspects of the disclosed technology. System 300 may include a transmitter 310 and a receiver 330. Transmitter 310 can comprise a light source, such as laser 312. Laser 312 can be similar to laser 212. Laser 312 can be optically coupled to modulator 314. Modulator 314 can be a modulator configured to modulate a "1D" format of light, e.g. SP-PAM. The output of transmitter 310 can be transmitted to receiver 330. During transmission from transmitter 310 to receiver 330, the orientation of the light which was generated at transmitter 310 can change in orientation, as explained above with reference to FIG. 2 through the representation of matrix U. Transmitter 310 will thus transmit light with only a quadrature or in-phase component of light in one direction of polarization. As transmitter 310 is a "1D" transmitter, it can modulate only one the in phase or quadrature component of light, eliminating the need for two MZMs.

At receiver 330, similar to FIG. 2, a transmitted signal first encounters PBS 332. PBS 332 may be similar to PBS 102 or 232. PBS 232 can separate the "X" and "Y" polarization components of the received optical signal and output those signals as an X signal and a Y signal. In some examples, PBS 232 can rotate one of the components rotates the Y-component so that it is also output as X-polarized signals. However, the rotation can occur at other components of receiver 330, such as before optical coupler 336 or at time delay element 334 as explained herein.

While light modulated from transmitter 310 was modulated only with X-polarization, the signals outputted from PBS 332 can comprise X-polarized and Y-polarized signals as a result of the rotation light during transmission. The "Y" component signal (which has now been rotated into a X-polarization state) is fed to a time delay element 334, which delays the signal it receives by a symbol period T. Time delay element 234 is capable of receiving and then delaying the transmission of a received signal by a period of time period of "T." In some examples, the time period 'T' can be related to a period of a frequency of the light which has been encoded and is being transmitted to avoid destructive interference between a delayed portion of an optical signal and a portion which has not been delayed, such as for example, the X-polarization and Y-polarization components.

The signals outputted from the PBS (X signal) and the time delay module 234 (Y signal) are coupled to an optical coupler (OC) 336, which then combines them into an output signal. This output signal can be sent to a 90 degree hybrid 342. 90 degree hybrid 342 can be similar to 90 degree hybrid 242. 90 degree hybrid can also receive a signal from a local oscillator 338 which can be similar to local oscillator 238. Similar to the function described in receiver 230, local oscillator 338 can provide a reference signal to assist with signal extraction.

Similar to the process described with respect to FIG. 2, 90 degree hybrid 342 outputs the X polarized light which contains both the information in the X and the Y signal and can contain both the I and Q component of the light. The signal outputted from the 90 degree hybrid 342 can be transmitted to PD/TIA 343 and PD/TIA 344. PD/TIAs 343-344 can be similar to PD/TIAs 110-116. PD/TIAs 343-344 output analog electrical signals of the I and Q signals to respective ADCs 245 and 246 as shown. The output of ADCs 345 and 346 are then coupled to DSP 350. DSP 350 can recover the transmitted 1D format signal.

Figure 4:
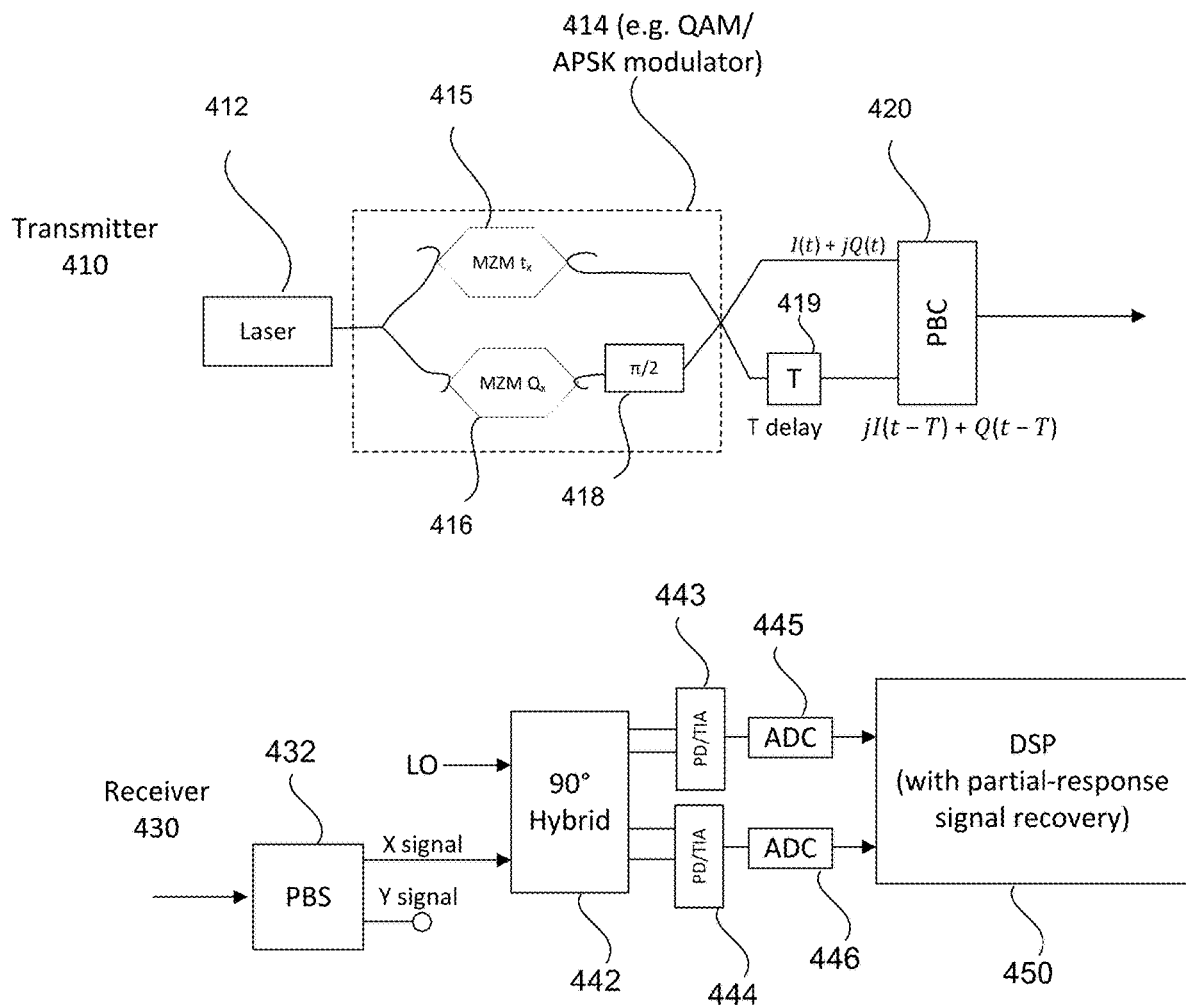
FIG. 4 illustrates a schematic example system according to aspects of the disclosure.

FIG. 4 depicts an example system 400 illustrating coherent optical technology in accordance with one or more aspects of the disclosed technology. System 400 may include a transmitter 410 and a receiver 430. Transmitter 410 can comprise a light source, such as laser 412. Laser 412 can be similar to laser 212 or laser 312. Laser 412 can be optically coupled to modulator 414. Modulator 414 can be similar to modulator 314.

System 400 includes a transmitter which delays one output of an I/Q modulator relative to the other by a symbol period and combines the delayed and un-delayed I/Q signals in a polarization beam combiner (PBC) for transmission through an optical fiber. In some examples, the transmitter can be configured to modulate two-dimensional QAM modulation formats.

As shown in FIG. 4, modulator 414 may include a Mach-Zehnder modulator (MZM) 315 which receives the inphase component of an optical signal generated by laser 412 and a Mach-Zehnder modulator 416 which receives a quadrature component of light generated by laser 412. Modulator 416 can be optically coupled with an element 418. Element 418 is capable of shifting or changing the phase of the angle of light. Although FIG. 4 illustrates element 418 to be the angle of light by 90 degrees or $\pi/2$ radians, element 418 can shift the angle of light by configurable degree. The signal transmitted from the phase shifter 418 can be represented as $I(t)+jQ(t)$.

Modulator 416 can be optically connected to a time delay module 419. Time delay module can be similar to time delay module 214 and can delay the optical signal by a time period of 'T,' corresponding to one or more symbol time periods. In general, T may be chosen or determined so that the X and Y components of light do not destructively interfere with one another. The signal which is emitted from time delay module 419 can be represented as jI(t−T)−Q(t−T). The optical signals from element 418 and from time delay module 419 can arrive at PBC 420, which can combine both components of the transmitted optical signal.

The output of transmitter 410 can be represented as:

$$\hat{E}_R(t) = [I(t)+jQ(t)]\hat{x} - [jI(t-T)+Q(t-T)]\hat{y} \quad (4)$$

As a person of skill in the art will appreciate from the equation above, as the X component and Y component are functions shifted by 'T' in time, it is possible to extract identical information from only the x or the y component. In some examples, it is possible or may be desirable to discard the x or y component of the signal above and only analyze the remaining portion.

The signal can be received by the receiver 430. Receiver 430 can be similar to receiver 330 and contain a PBS 432, which can be similar to PBS 332. PBS 432 can split the received optical signals into an X signal corresponding to the X component and a Y signal corresponding to they component. As will be appreciated from the equations described herein, the Y component is a redundant copy or otherwise generally contains the same information encoded within the X component signal, and can thus be discarded. In some examples, no analysis or monitoring the Y component will take place. In other examples, a y component of the optical signal can optionally be monitored for analysis or quality of service requirements.

Upon transmission, the X component of the optical signal received at receiver 430 and transmitted through optical fiber can be represented as:

$$\hat{E}_{Rx}(t) = \cos(\alpha)[I(t)+jQ(t)]\hat{x} - \sin(\alpha)e^{-j\theta}[I(t-T)+jQ(t-T)]\hat{x} \quad (5)$$

The X signal above received at PBS 432, separated into an X only optical path, and thereafter be transmitted to a 90 degree hybrid 442. 90 degree hybrid 442 can also receive a signal from local oscillator 438. Local oscillator 438 can be similar to local oscillator 238 and be used as a reference signal to recover the in-phase and quadrature signals.

In a manner similar to that described with respect to the figures above, an optical signal transmitted from 90 degree hybrid 442 can be received at PD/TIAs 443 and 444. PD/TIAs 444 and 446 can be similar to PD/TIAs 243 and 244. Similar to system 200 and system 300, PD/TIA 443 and 444 can be connected to ADCs 445 and 446, which are in turn connected to a DSP 450. DSP 450 can be similar to the DSP described with reference to FIG. 6.

As will be appreciated by a person of skill in the art, as compared to system 200 and system 300, system 400 does not require an optical coupler. In this manner, a signal loss due to the optical coupler is avoided. As the signal is contained within the X component, an additional receiver side polarization-folding is not required. The transmission link plus the receiver PBS equivalently performs the polarization folding function, for example, a 2D receiver can be used to recover a 2D modulated signal.

Figure 5:
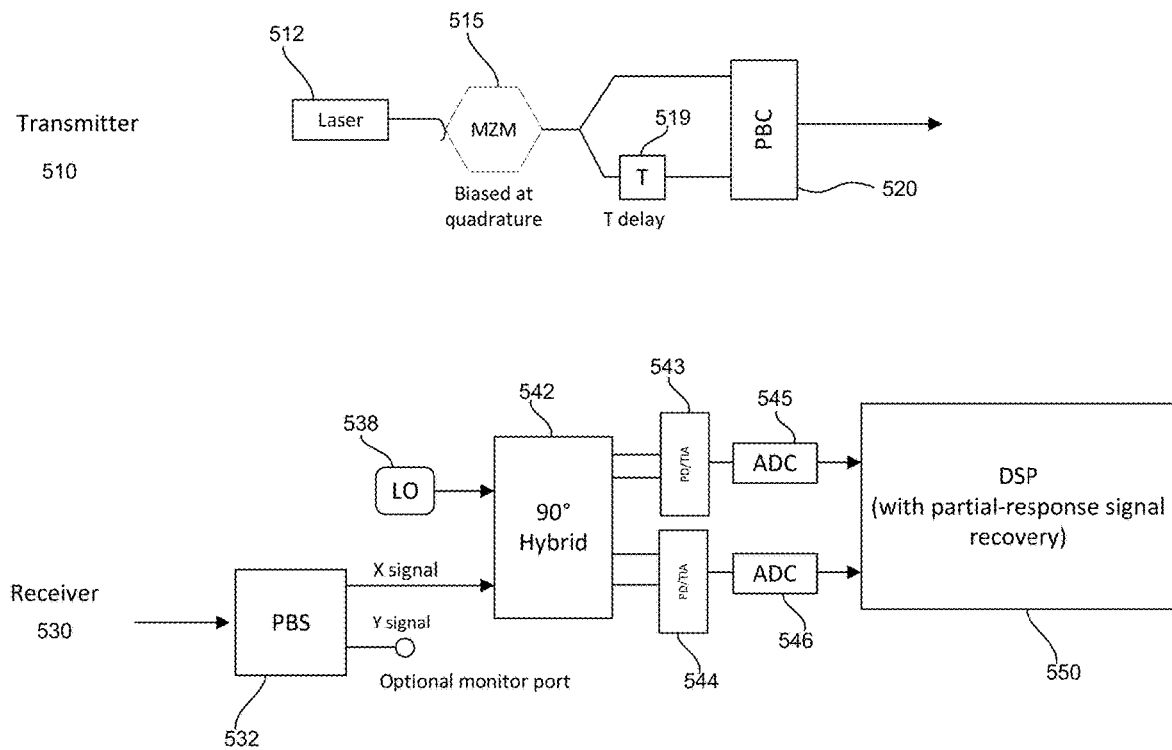
FIG. 5 illustrates a schematic example system according to aspects of the disclosure.

FIG. 5 illustrates additional aspects of the disclosed technology. FIG. 5 illustrates system 500. In some examples, system 500 can be used for "1D" modulation formats, such as for example, 1D PAMs. As will be appreciated from the description below and FIG. 5, system 500 enables the transmission of 1D modulation formats without the need for an optical rotator.

System 500 can contain a transmitter 510 and a receiver 530. Transmitter 510 can contain a laser 512, which can be similar to the lasers described above, such as laser 212. Transmitter 510 can contain an MZM 815 which can be similar to MZMs 215 or MZM 216, a time delay module 519 which can be similar to time delay module 419, and a PBC 520 which can be similar to PBC 320. Light emitted from laser 512 can be transmitted to MZM 515, and in turn to the time delay module 519 and the PBC 520. The light signal received at time delay module 519 can be sent to PBC 820 after adding a time delay of "T" to the signal. The light emitted from PBC 520 can be carried over an optical fiber or other medium to receiver 530.

Receiver 530 can be similar to receiver 430, and contain a PBS 532, similar to PBS 432, which receives a signal from PBC 520. Similar to the description given above with reference to FIG. 4, the "x" or "y" component of the signal can be utilized while the other portion of the signal discarded or optionally used as a monitor port. PBS 532 can split the received optical signals into an X signal corresponding to the $\hat{x}$ component and a Y signal corresponding to the $\hat{y}$ component. In some examples, no analysis or monitoring the Y component will take place. In other examples, a y component of the optical signal can optionally be monitored for analysis or quality of service requirements.

The signal transmitted from PBS 532 can be received at a 90 degree hybrid 542. 90 degree hybrid 542 can be similar to 90 degree hybrid 342. 90 degree hybrid 842 can also receive a signal from LO 538, which can be similar to LO 338. The signal from the 90 degree hybrid 842 can be sent to PD/TTAs 533 and 534, which can be similar to PD/TTAs 543 and 544. The signal emitted from PD/TTAs 533 and 534 can be sent to ADCs 545 and 546. These ADCs can be similar to 345 and 346. The ADCs can convert the captured signal to a digital signal and transmit the signal to a DSP 550. DSP 550 can be similar to any of the DSPs described herein, including DSPs 250, 350, and 450.

The X signal above received at PBS 532 is separated into an X only optical path, and thereafter transmitted to a 90 degree hybrid 542, which can be similar to 90 degree hybrid 442. 90 degree hybrid 542 can also receive a signal from local oscillator 538. Local oscillator 538 can be similar to local oscillator 238 and be used as a reference signal to recover the in-phase and quadrature signals.

In a manner similar to that described with respect to the figures above, an optical signal transmitted from 90 degree hybrid 542 can be received at PD/TIAs 543 and 544. PD/TIAs 544 and 546 can be similar to PD/TIAs 243 and 244. Similar to system 200 and system 300, PD/TIA 543 and 544 can be connected to ADCs 545 and 546, which are in turn connected to a DSP 550. In some examples, DSP 550 can be similar to the DSP described with reference to FIG. 6.

As will be appreciated by a person of skill in the art, as compared to system 200 and system 300, system 500 does not require an optical coupler. In this manner, a signal loss due to the optical coupler is avoided. As the signal is contained within the X component, an additional receiver side polarization-folding is not required.

Figure 6:
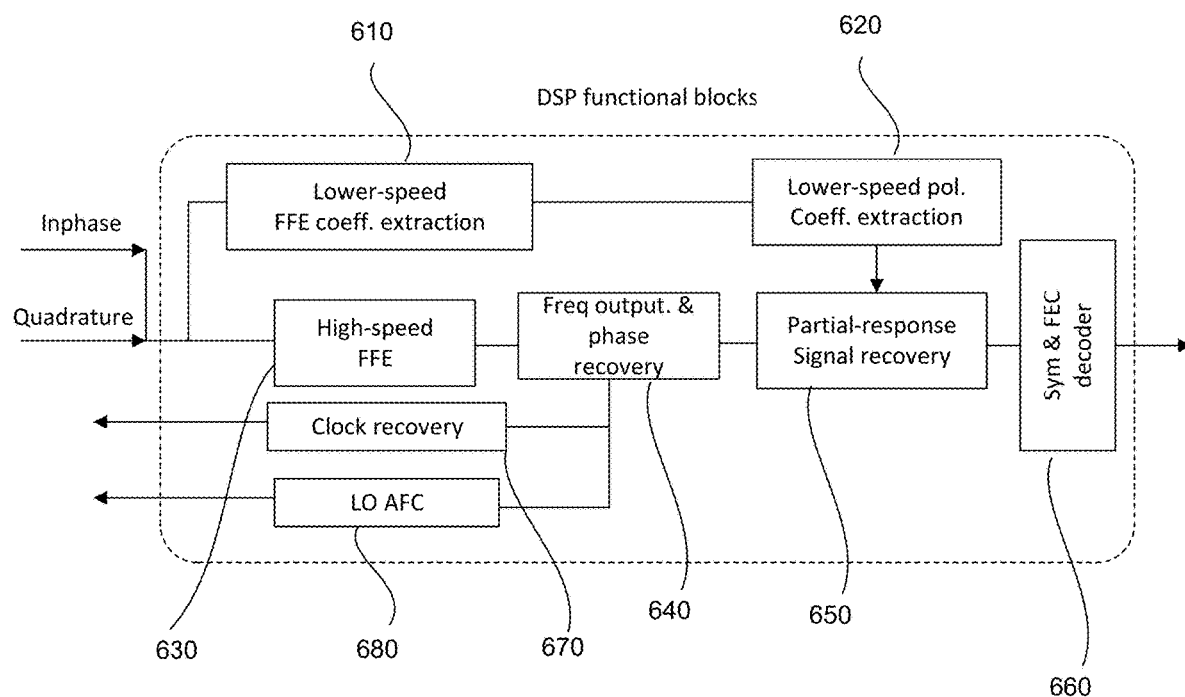
FIG. 6 illustrates an example digital signal processor according to aspects of the disclosure.

FIG. 6 illustrates a schematic representation of a digital signal processor (DSP) 600. As shown in FIGS. 2-4, the output of the respective ADCs are coupled to respective DSPs for further processing. The DSPs implement the algorithms necessary to process the digital signals received from the ADCs so as to recover the transmitted information. DSP can be used for symbol or information signal recovery according to aspects of the disclosed technology. As transmission link polarization parameters can change over time, such as for example the polarization angles α and θ, the parameters or angles can be tracked in a dynamic manner. Tracking of polarization parameters (i.e. the α and θ,) can occur through sending a polarization training sequence at the transmitter side, and using a lower-speed polarization parameter extraction circuit at a receiver side. Then a "single-tap" 2D MLSE algorithms can used to recover the signal based on the extracted polarization parameters. Aspects of a "single-tap" algorithm are described below with reference to FIGS. 7 and 8, such as in method 700 and method 800.

DSP 600 can receive in-phase and quadrature components of an optical signal, as described for example in the configurations of FIGS. 2 and 3. In some examples, the components received have already been converted to a digital signal through the use of an analog to digital convertor. The received signal can be processed using a lower speed Feed-Forward Equalizer (FFE) coefficient extraction block 610. A FFE is generally circuitry that acts a filter to compensate for frequency dependent loss of a communication channel. At block 610, the low speed coefficients for the FFE are extracted from the recovered I and Q signals through, for example, non-streaming block by block (to allow lower-speed operation) training based or blind adaptive equalization algorithm. Block 610 communicates with a lower speed polarization coefficient extraction block 620, which use the periodically inserted training signal to extract the two polarization coefficients (the α and θ) in a non-streaming block by block manner. High speed FFE block 630 receives the I and Q signals and outputs a signal to frequency and phase recovery block 640. Block 640 outputs a signal which is split to clock recovery block 670 and. Clock recovery block 670 recovers a clock signal 670 and LO AFC block 680 recovers a local oscillator (LO) signal whose signal frequency is automatically adjusted via automatic frequency control (AFC). Another output from block 640 is fed to partial signal recovery block 650, which is discussed in further detail below in accordance with further aspects of the disclosed technology. The output of block 650 is coupled to symbol and forward error correction (FEC) block 650, which outputs the recovered symbols or information.

Although the above description of block 600 has been given with respect to a particular architecture of blocks and circuitry, a person of skill in the art will appreciate that other configurations, settings, permutations, combinations, and variations of blocks can be used to form DSP 400. In addition, various permutations, combinations, or reordering of the following steps referenced with respect to FIG. 4 can be made.

Figure 7:
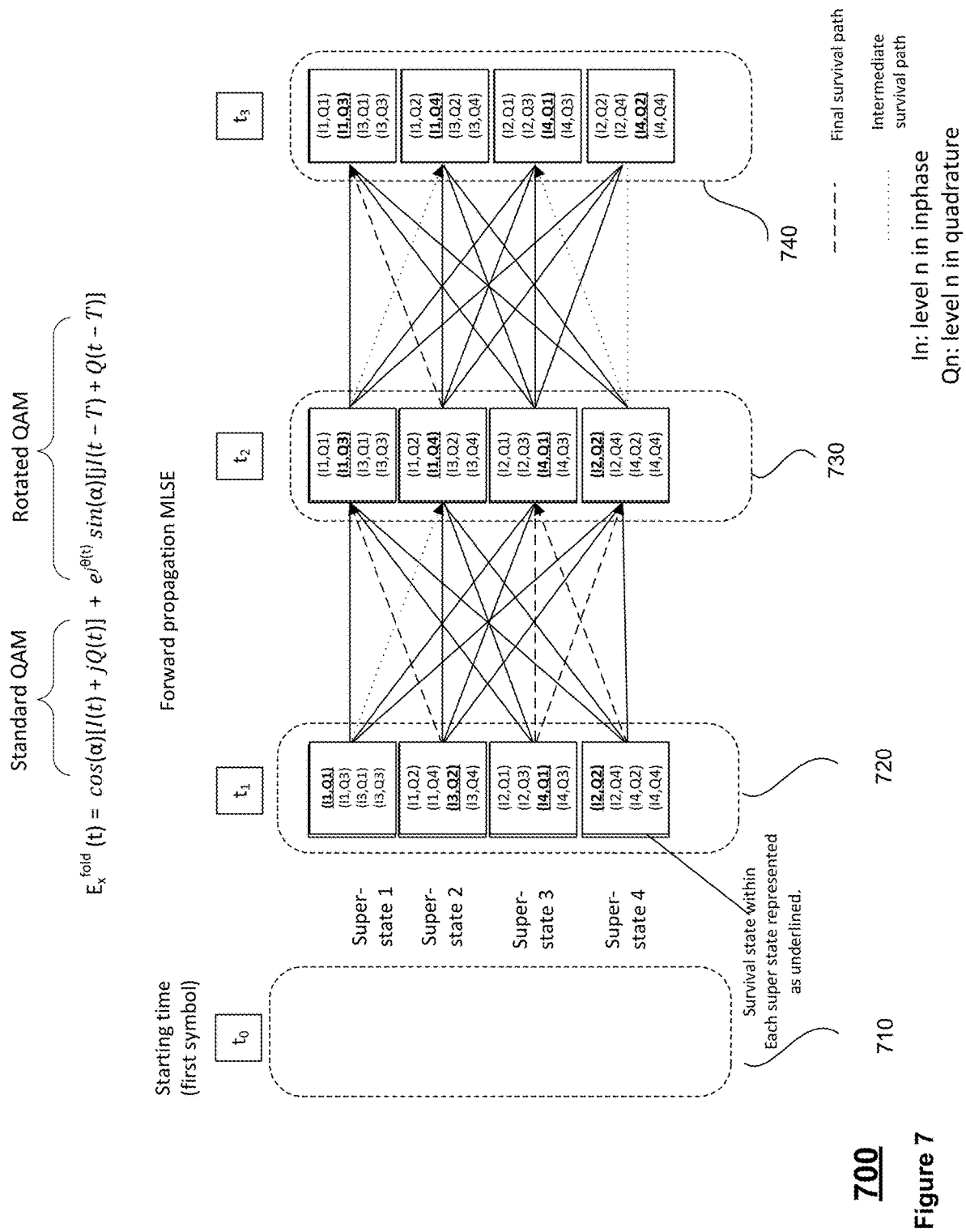
FIG. 7 is an example schematic view of a method of forward propagation maximum likelihood sequence estimation according to aspects of the disclosure.

FIG. 7 illustrates aspects of method 700. For instance, method 700 can be considered or be part of a "single-tap" algorithm. Method 700 can be used to reduce the amount of power consumption of a DSP. In some examples, the power consumption of the DSP can be reduced by an order of magnitude. In addition, method 700 can be used to reduce the amount of implementation complexity of aspects of the disclosed technology, methods, and techniques. More specifically, the method 700 may be implemented in DSP 500 as part of partial-response signal recovery block 650.

In accordance with aspects of the disclosed technology FIG. 7 shows a swim-lane type diagram showing a technique for demodulation of a polarization folded 2D-16QAM signal. However, a person of skill in the art will appreciate that other types of coding schemes can be used in accordance with the technology described herein. FIG. 7 also illustrates a final survival path between states, and an intermediate path. Other paths shown therein illustrate possible connections between the various states.

Method 700 can be used as a method of forward propagation MLSE or forward path MLSE. In some examples, the forward propagation MLSE can be used when the polarization angle is less than 45 degrees. Forward propagation MLSE can be a better choice when the polarization angle α is less than 45 degrees. For instance, the detected signal (see Eq. 5) consists of two components, one from the current symbol, which is proportional to $\cos(\alpha)$, while the other one from the previous symbol (i.e. the delayed portion), which is proportional to $\sin(\alpha)$. When a is less than 45 degrees, the current symbol contributes more than the previous symbol to the detected signal, this make forward-propagation MLSE works better than backward-propagation MLSE since it allows more accurate intermediate survival path determination: the intermediate survival path is determined by assuming a known pre-symbol, and then find the most likely current symbol from all possible current symbol choices, thus a larger portion in the detected signal will help more accurate symbol determination. One extreme example is if $\cos(\alpha)=0$, then there is no contribution from the current symbol in the detected signal, thus there is no way estimating the current symbol from the detected signal.

At block 710, a set-partition algorithm can be used to reduce the number of MLSE states. For example, in a 16 QAM the number of MLSE states can be reduced from 16 regular states to a set of 4 superstates. For example, 16 regular states may each be a vector or n-tuple, but the 16 states can be combined to a 4 by nor set of n-tuples Step 510 can occur at time to. However, the steps of method 700 can occur in any order. The principle of set-partitioning is to divide the regular states into multiple groups to form superstates, where each superstate consists of multiple regular states and the Euclidean distance for states within each superstate is greater than the normal Euclidean distance for the regular states without set-partitioning.

At block 720, a selection of one state from each set of superstates can occur. For example, from each super state, a single state can be chosen. The chosen state from each superstate can be considered to be a surviving state. Step 720 can occur at time ti.

At block 730, a Euclidean distance based branch metric criterion to estimate distance between the states illustrated in FIG. 7 In some examples, a distance D used as a criterion for forward selection of the states can be defined as D=Max [Abs $(I_{est}-I_{det})$, Abs$(Q_{est}-Q_{det})$]. Stated alternatively, D is the maximum value of either the absolute value of $(I_{est}-I_{det})$ or $(Q_{est}-Q_{det})$. I and Q refer to the inphase and quadrature phases respectively. "EST" as used in the formulas above refer to estimated in-phase and quadrature signals. "DET" as used above denotes the detected in-phase and quadrature signals respectively.

At block 740, a lookup table can be used to calculate the values of $I_{est}$ and $Q_{est}$. As can be appreciated from the discussion above, the inphase and quadrature components are related to $c(\alpha)[I(t)+jQ(t)]$ and $\sin(\alpha)e^{-j\theta}[I(t-T)+jQ(t-T)]$ respectively. The calculation of the "$c(\alpha)[I(t)+jQ(t)]$" term only require 4 real numbers to compute. The calculation of the "$s(\alpha)e^{-j\theta}[I(t-T)+jQ(t-T)]$" term only requires 16 complex numbers to compute. The use of a lookup table and the distance above removes the need for computationally intensive and power-hungry multiplication operations.

Figure 8:
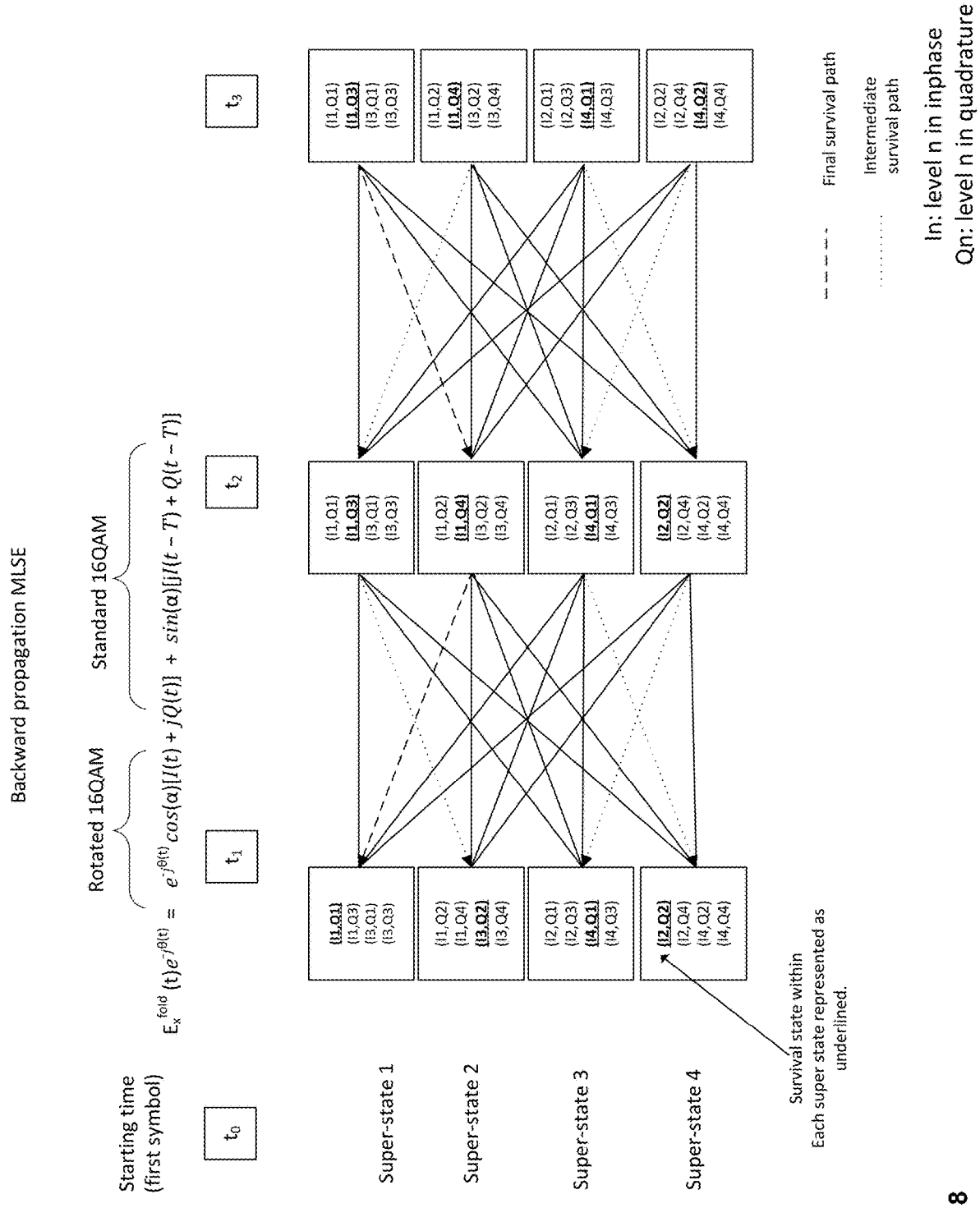
FIG. 8 is an example schematic view of a method of backward propagation maximum likelihood sequence estimation according to aspects of the disclosure.

FIG. 8 illustrates method 800 related to backward propagation MLSE or backward pass MLSE. For instance, method 800 can be considered or be part of a "single-tap"

algorithm. As an example, the backward propagation MLSE method described with respect to method 600 can be used for demodulation of the polarized folded 2D 16 QAM signal described herein. Method 600 can be carried out similar to method 500 in selection of MLSE states but uses backward propagation rather than forward propagation to come to a final result.

In some examples, the forward and backward propagation techniques described herein can be selectively applied or be applied in combination.

Figure 9:
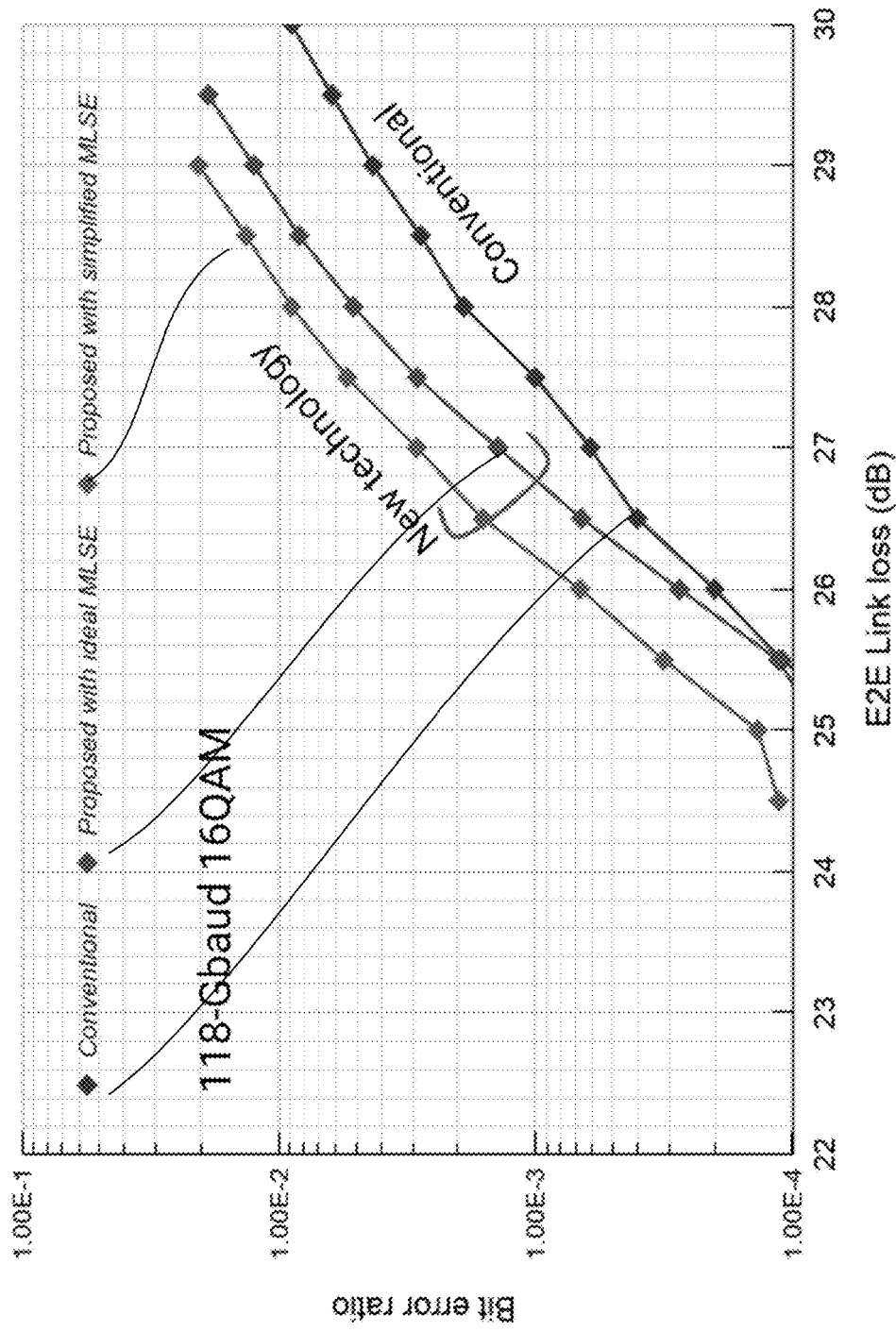
FIG. 9 illustrates example aspects of performance of aspects of the disclosure.

FIG. 9 illustrates aspects of the disclosed technology as they relate to baseline performance. FIG. 9 illustrates performance for a non-amplified 118 Gbaud 16QAM system using the conventional polarization and phase diversity coherent technology (left most line of FIG. 9), the polarization-folding coherent optical technology with ideal 1-tap MLSE (proposed with ideal MLSE) (middle line of FIG. 9) and with the proposed low-power MLSE (right most line of FIG. 9). As simulated, a single laser is used for both the signal and LO, with a splitting ratio of 3 to 1. The laser power is assumed to be 13 dBm, corresponding to 11.75 dBm signal power and 7 dBm LO power. The MZM is driven with 0.8 Vpi, biasing at the null point. The Tx bandwidth (Driver and MZM) is assumed to be 70 GHz, while the PD/TIA and ADC bandwidth are assumed to be 60 Hz. TIA thermal noise is assumed to be 16 pA/Hz. The E2E link loss is defined as the end to end link loss, including the Tx MZM insertion loss, Tx coupling loss, the transmission link loss, and the Rx coupling loss. Waveguide loss and excess PBS/PBC/OC losses are neglected for the simulation described in FIG. 9.

As can be appreciated from FIG. 9 the disclosed 2D coherent receiver technology can achieve a similar performance as the conventional 4D polarization-diverse coherent receiver when BER is below the typical KP4 FEC threshold $2e$-4.

Figure 10:
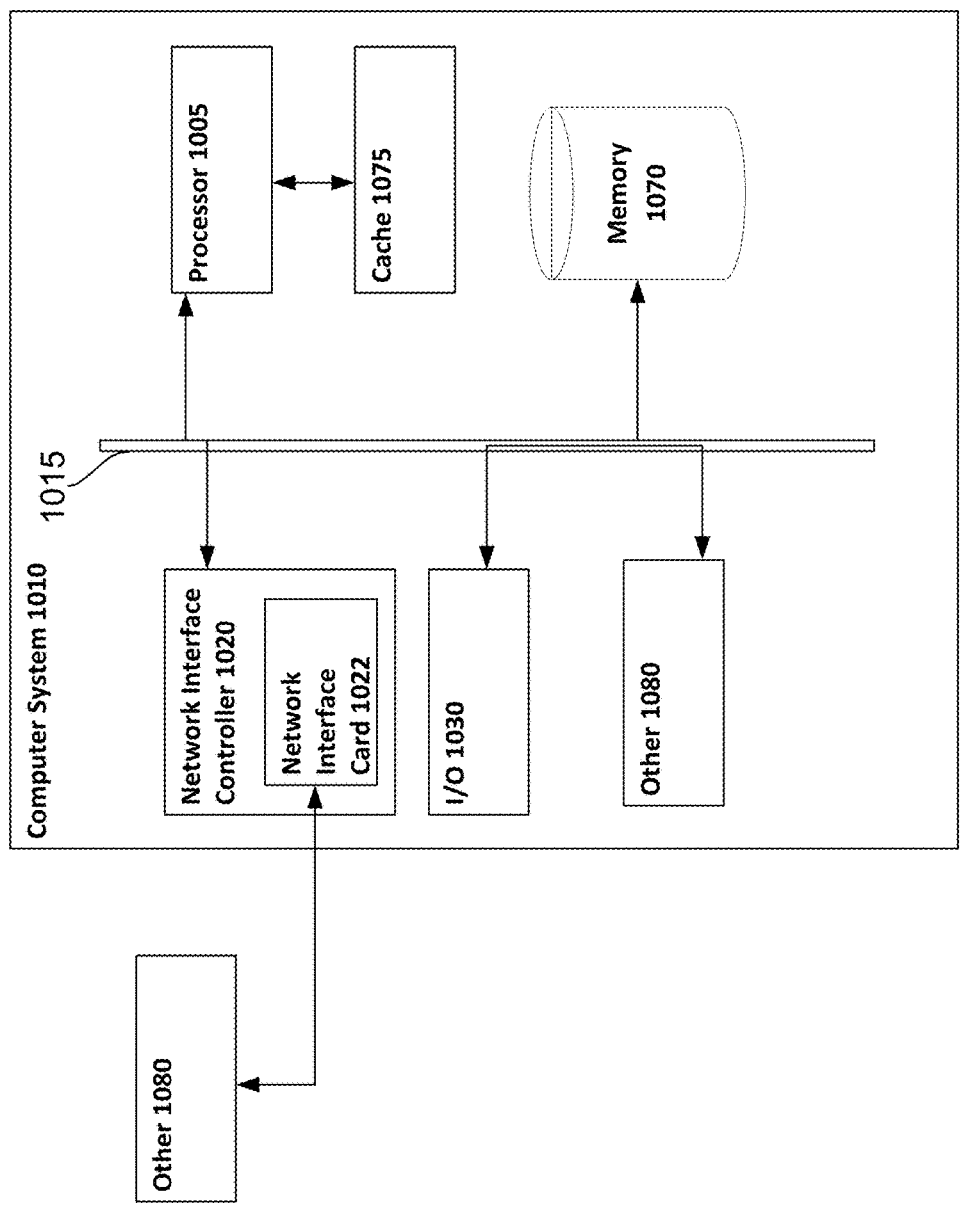
FIG. 10 is a schematic example computer system according to aspects of the disclosure.

FIG. 10 is a block diagram 1000 illustrating an example computer system 1010 with which aspects of this disclosure, including the machine learning systems and techniques described herein, and any components thereof, can be implemented. In certain aspects, the computer system 1010 may be implemented using hardware or a combination of software and hardware, either in a dedicated server, or integrated into another entity, or distributed across multiple entities. In some examples, example computing system 1010 can be a user computing system or device.

In broad overview, the computing system 1010 includes at least one processor 1050 for performing actions in accordance with instructions and one or more memory devices 1070 or 1075 for storing instructions and data. The illustrated example computing system 1010 includes one or more processors 1050 in communication, via a bus 1015, with at least one network interface driver controller 1020 with one or more network interface cards 1022 connecting to one or more network devices 1024, memory 1070, and any other devices 1080, e.g., an I/O interface. The network interface card 122 may have one or more network interface driver ports to communicate with the connected devices or components. Generally, a processor 1050 executes instructions received from memory. The processor 1050 illustrated incorporates, or is directly connected to, cache memory 1075.

In more detail, the processor 1050 may be any logic circuitry that processes instructions, e.g., instructions fetched from the memory 1070 or cache 1075. In many embodiments, the processor 1050 is a microprocessor unit or special purpose processor. The computing device 1010 may be based on any processor, or set of processors, capable of operating as described herein. The processor 1050 may be a single core or multi-core processor. The processor 1050 may be multiple processors. In some implementations, the processor 1050 can be configured to run multi-threaded operations. In some implementations, the processor 1050 may host one or more virtual machines or containers, along with a hypervisor or container manager for managing the operation of the virtual machines or containers. In such implementations, the methods shown and described above or the electronics described above can be implemented within the virtualized or containerized environments provided on the processor 1050 or otherwise operate in conjunction with processor 1050.

The memory 1070 may be any device suitable for storing computer readable data. The memory 1070 may be a device with fixed storage or a device for reading removable storage media. Examples include all forms of non-volatile memory, media and memory devices, semiconductor memory devices, such as EPROM, EEPROM, SDRAM, and flash memory devices, magnetic disks, magneto optical disks, and optical discs, such as CD ROM, DVD-ROM, and Blu-ray® discs. A computing system 1010 may have any number of memory devices 1070. In some implementations, the memory 1070 supports virtualized or containerized memory accessible by virtual machine or container execution environments provided by the computing system 1010.

The cache memory 1075 is generally a form of computer memory placed in close proximity to the processor 1050 for fast read times. In some implementations, the cache memory 1075 is part of, or on the same chip as, the processor 1050. In some implementations, there are multiple levels of cache 1075, e.g., L2 and L3 cache layers.

The network interface driver controller 1020 manages data exchanges via the network interface driver 1022 (also referred to as network interface driver ports). The network interface driver controller 1020 handles the physical and data link layers of the OSI model for network communication. In some implementations, some of the network interface driver controller's tasks are handled by the processor 1050. In some implementations, the network interface driver controller 1020 is part of the processor 1050. In some implementations, a computing system 113 has multiple network interface driver controllers 1020. The network interface driver ports configured in the network interface card 1022 are connection points for physical network links. In some implementations, the network interface controller 1020 supports wireless network connections and an interface port associated with the network interface card 1022 is a wireless receiver/transmitter. Generally, a computing device 1010 exchanges data with other network devices 1024 via physical or wireless links that interface with network interface driver ports configured in the network interface card 1022. In some implementations, the network interface controller 1020 implements a network protocol such as Ethernet.

The other network devices 1024 are connected to the computing device 1010 via a network interface driver port included in the network interface card 1022. The other network devices 1024 may be peer computing devices, network devices, or any other computing device with network functionality. For example, a first network device 1024 may be a network device such as a hub, a bridge, a switch, or a router, connecting the computing device 1010 to a data network such as the Internet.

The other devices 1080 may include an I/O interface, external serial device ports, and any additional co-processors. For example, a computing system 113 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 1000 includes an additional device 1080 such as a coprocessor, e.g., a math co-processor can assist the processor 1050 with high precision or complex calculations.

Instructions on computing system 1010 may control various components and functions of computing system 1010. For example, the instructions may be executed to perform any of the methods indicated in this disclosure. In some examples, algorithms can be included as a subset of or otherwise as part of instructions included on computing system 1010. Instructions can include algorithms to execute any of the methods or a subset of the methods described within this disclosure.

User interfaces on the computing system 1010 may include a screen which allows a user to interact with computing system 1010, such as a touch screen or buttons. A display can also be included such as an LCD, LED, mobile phone display, electronic ink, or other display to display information about computing system 1010. The user interface can allow for both input from a user and output to a user. A communication interface(s) can include hardware and software to enable communication of data over standards such as Wi-Fi, Bluetooth, infrared, radio-wave, and/or other analog and digital communication standards. Communication interface(s) allow for computing system 1010 to be updated and information generated by computing system 1010 to be shared to other devices. In some examples, communication interface(s) can send information stored in memory to another user device for display, storage or further analysis.

Although the above examples are given with respect to particular methods of encoding signals and are exemplary, a person of skill in the art will appreciate understand that additional variations and configurations of such methods are possible. In addition, the methods and technology disclosed herein can be combined in various permutations.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Non-limiting aspects of the disclosed technology can include the following features:

¶1. An optical transmission system, comprising:
 a polarization beam splitter having an input port, a first optical output port and a second optical output port, the input port coupled to an optical communication channel, the first optical output port providing a first optical signal derived from an encoded optical signal received over the optical communication channel and the second optical output port providing a second optical signal derived from the encoded optical signal, the first optical signal having a first polarization component and the second optical signal having a second polarization component;
 a delay element coupled to the second optical output port of the polarization beam splitter and configured to delay the second optical signal by a pre-determined time period to produce a delayed second optical signal;
 an optical coupler that includes a first input coupled to the first optical output of the polarization beam splitter and a second input coupled to the delay element so as to receive the delayed second optical signal, the optical coupled combining the first optical signal and the delayed second optical signal to form a combined optical signal, and
 a polarization rotator configured to rotate a polarization component of either the second optical signal or the delayed second optical signal into a polarization state corresponding to the first polarization component.

¶2. The optical transmission system of ¶1, wherein the polarization beam splitter includes the polarization rotator and the second optical signal is rotated into the polarization state corresponding to the first polarization component.

¶3. The optical transmission system of any of ¶¶1 to 2, wherein the polarization rotator is coupled to the delay element and configured to receive the delayed second optical signal and rotate a polarization state of the delayed second optical signal into the polarization state corresponding to the first polarization component.

¶4. The optical transmission system of ¶3, wherein the optical coupler includes the polarization rotator.

¶5. The optical transmission system of ¶¶1-4, wherein the optical coupler comprises a 3-dB coupler.

¶6. The optical transmission system of ¶¶1-5, wherein the combined optical signal comprises a folded optical signal in which the first optical signal comprises a first X-polarized signal and the delayed second optical signal comprises a second X-polarized signal delayed by the predetermined time period.

¶7. The optical transmission system of ¶6, wherein the predetermined time period comprises a time period of one more symbol period.

¶8. The optical transmission system of ¶7, wherein a symbol period corresponds to a time period it takes to transmit a predetermined number of bits.

¶9. The optical transmission system of ¶¶6-8, comprising an X-polarized hybrid element for recovering respective in-phase (I) and quadrature phase (Q) optical signals from the folded optical signal.

¶10. The optical transmission system of ¶¶1-9, comprising first and second photodetector/transimpedance amplifiers for receiving the respective in-phase (I) and quadrature phase (Q) optical signals and produce respective first and second electrical I and Q signals.

¶11. The optical transmission system of ¶10, comprising first and second analog-to-digital converters for converting the respective first and second electrical I and Q signals into respective electrical digital signals.

¶12. A method for transmission of optical signals comprising:
deriving for output, from an encoded optical signal received at a polarization beam splitter (PBS), a first optical signal at a first output port of the PBS and a second optical signal at a second output port of the PBS, the first optical signal having a first polarization component and the second optical signal having a second polarization component;
delaying the second optical signal by a pre-determined time period to produce a delayed second optical signal;
combining the first optical signal and the delayed optical signal at an optical coupler; and
rotating a polarization component of either the second optical signal or the delayed second optical signal.

¶13. The method of ¶12 comprising wherein a polarization beam splitter rotates either the second optical signal or the delayed second optical signal.

¶14. The method of any of ¶¶12-13 wherein the polarization rotator is coupled to the delay element and configured to receive the delayed second optical signal and rotate a polarization state of the delayed second optical signal into the polarization state corresponding to the first polarization component.

¶15. The method of any of ¶¶12-14 wherein the optical coupler includes the polarization rotator.

¶16. The method of any of ¶¶12-15, wherein the optical coupler comprises a 3-dB coupler.

¶17. The method of claim any of ¶¶12-16 wherein the combined optical signal comprises a folded optical signal in which the first optical signal comprises a first X-polarized signal and the delayed second optical signal comprises a second X-polarized signal delayed by the predetermined time period.

¶18. The method of ¶17, wherein the predetermined time period comprises a time period of one more symbol period.

¶19. The method of any of ¶¶12-18, wherein a symbol period corresponds to a time period it takes to transmit a predetermined number of bits.

¶20. The method of any of ¶¶12-19, wherein an X-polarized hybrid element is configured for respective in-phase (I) and quadrature phase (Q) optical signals from the folded optical signal.

¶21. The method or optical transmission system of ¶20, wherein a first and a second photodetector/transimpedance amplifiers are configured for receiving the respective in-phase (I) and quadrature phase (Q) optical signals and produce respective first and second electrical I and Q signals.

¶22. The method or optical transmission system of ¶21, wherein a first and a second analog-to-digital converters are configured for converting the respective first and second electrical I and Q signals into respective electrical digital signals.

¶23. An optical transmission system, comprising:
an optical modulator that outputs an in-phase (I) signal and a quadrature phase (Q) signal;
a delay element for delaying the in-phase (I) signal and the quadrature phase (Q) signal by a pre-determined time period to produce a delayed in-phase (I) signal and a delayed quadrature phase (Q) signal;
a polarization beam combiner (PBC) for outputting the in-phase (I) signal, the quadrature phase (Q) signal, the delayed in-phase (I) signal, and the delayed quadrature phase (Q) signal as a folded optical signal having polarized light corresponding to a first polarization component; and
a receiver that receives the optical signal, the receiver including a polarization beam splitter (PBS) that separates the received optical signal into the first polarization component and a second polarization component.

¶24. The optical transmission system of ¶23, wherein the receiver comprises a polarized hybrid element for recovering respective in-phase (I) and quadrature phase (Q) optical signals from the folded optical signal.

¶25. The optical transmission system of ¶24 wherein the first polarization component corresponds to X-polarized light and the second polarization component corresponds to Y-polarized light.

¶26. The optical transmission system of ¶25, wherein the polarized hybrid element comprises a X-polarized hybrid element.

¶27. The optical transmission system of any of ¶¶24-26, comprising first and second photodetector/transimpedance amplifiers coupled to an output of for receiving the respective in-phase (I) and quadrature phase (Q) optical signals and produce respective first and second electrical I and Q signals.

¶28. The optical transmission system of ¶27, comprising first and second analog-to-digital converters for converting the respective first and second electrical I and Q signals into respective electrical digital signals.

¶29. A method for transmission of optical signals comprising:
modulating a baseband information signal to produce an in-phase (I) signal and a quadrature phase (Q) signal;
delaying the in-phase (I) signal and the quadrature phase (Q) signal by a pre-determined time period to produce a delayed in-phase (I) signal and a delayed quadrature phase (Q) signal
combining the in-phase (I) signal, the quadrature phase (Q) signal, the delayed in-phase (I) signal, and the delayed quadrature phase (Q) signal as a folded optical signal having polarized light corresponding to a first polarization component;
separating the received optical signal into the first polarization component and a second polarization component.

¶30. The method of ¶29 further comprising recovering respective in-phase (I) and quadrature phase (Q) optical signals from the folded optical signal at a receiver containing a polarized hybrid element.

¶31. The method of any of ¶¶29-30 wherein the first polarization component corresponds to X-polarized light and the second polarization component corresponds to Y-polarized light.

¶32. The method of ¶31, wherein the polarized hybrid element comprises an X-polarized hybrid element.

¶33. The method of any of ¶¶29-32 comprising receiving the respective in-phase (I) and quadrature phase (Q) optical signals and produce respective first and second electrical I and Q signals occurs at a first and a second photodetector/ transimpedance amplifiers are coupled to an output.

¶34. The method of any of ¶¶29-33 comprising converting the respective first and second electrical I and Q signals into respective electrical digital signals occurs at a first and a second analog-to-digital converters.

The invention claimed is:

1. A coherent optical receiver, comprising:
   one or more devices for processing optical signals that include X-polarization components and Y-polarization components, the one or more devices being configured to:
   separate the X-polarization components and the Y-polarization components;
   rotate the Y-polarization components into a X-polarization space associated with the X-polarization components to form one or more rotated Y-polarization components;
   delay the one or more rotated Y-polarization components by one or more symbol periods of duration T to form one or more delayed Y-polarization components;
   fold the one or more delayed Y-polarization components into the X-polarization components to form one or more folded optical signals by combining the X-polarization components and the delayed Y-polarization components, wherein the X-polarization components and the delayed Y-polarization components are in the X-polarization space associated with the X-polarization components and the Y-polarization components of the one or more folded optical signals are delayed relative to the X-polarization components of the one or more folded optical signals; and
   a phase diversity two dimensional (2D) coherent receiver coupled to the one or more devices to detect the one or more folded optical signals, and
   wherein the one or more folded optical signals are interfered with a local oscillator signal to recover one or more I components and Q components of the one or more folded optical signals.

2. The coherent optical receiver of claim 1, wherein the one or more devices comprise a polarization beam splitter configured to separate the X-polarization components and the Y-polarization components.

3. The coherent optical receiver of claim 1, wherein the one or more devices comprise a delay element configured to delay the one or more rotated Y-polarization components by one or more symbol periods of duration T to form the one or more delayed Y-polarization components.

4. The coherent optical receiver of claim 1, wherein the one or more devices comprise a polarization rotator configure to rotate the Y-polarization components into a X-polarization space associated with the X-polarization components to form the one or more rotated Y-polarization components.

5. The coherent optical receiver of claim 1, wherein the one or more devices comprise an optical coupler configured to fold the one or more delayed Y-polarization components into the X-polarization components to form the one or more folded optical signals.

6. The coherent optical receiver of claim 5, wherein the optical coupler comprises a 3-db coupler.

7. The coherent optical receiver of claim 6, wherein the optical coupler folds fold the one or more delayed Y-polarization components into the X-polarization components to form one or more folded optical signals by combining the one or more delayed Y-polarization components with the X-polarization components.

8. A method for recovering optical signals that include X-polarization components and Y-polarization components, comprising: separating the X-polarization components and the Y-polarization components;
   rotating the Y-polarization components into a X-polarization space associated with the X-polarization components to form one or more rotated Y-polarization components;
   delaying the one or more rotated Y-polarization components by one or more symbol periods of duration T to form one or more delayed Y-polarization components;
   folding the one or more delayed Y-polarization components into the X-polarization components to form one or more folded optical signals by combining the X-polarization components and the delayed Y-polarization components, wherein the X-polarization components and the delayed Y-polarization components are in the X-polarization space associated with the X-polarization components and the Y-polarization components of the one or more folded optical signals are delayed relative to the X-polarization components of the one or more folded optical signals; and
   detecting the one or more folded optical signals with a phase diversity two dimensional (2D) coherent receiver, and
   interfering the one or more folded optical signals with a local oscillator signal to recover one or more I components and Q components of the one or more folded optical signals.

9. The method for recovering optical signals of claim 8, wherein separating comprises separating the X-polarization components and the Y-polarization components using a polarization beam splitter.

10. The method for recovering optical signals of claim 8, wherein delaying comprises delaying the one or more rotated Y-polarization components by one or more symbol periods of duration T using a delay element.

11. The method for recovering optical signals of claim 8, wherein rotating comprises rotating the Y-polarization components into a X-polarization space associated with the X-polarization components using a polarization rotator.

12. The method for recovering optical signals of claim 8, wherein folding comprises folding the one or more delayed Y-polarization components into the X-polarization components using an optical coupler.

13. The method for recovering optical signals of claim 12, wherein the optical coupler comprises a 3-db coupler.

14. The method for recovering optical signals of claim 13, wherein folding comprises combining the one or more delayed Y-polarization components with the X-polarization components.

* * * * *